(12) United States Patent
Kwon et al.

(10) Patent No.: US 9,413,084 B2
(45) Date of Patent: Aug. 9, 2016

(54) SECONDARY BATTERY PACK BASED ON MECHANICAL CONNECTION MANNER

(71) Applicant: LG CHEM, LTD., Seoul (KR)

(72) Inventors: Gi-Hwan Kwon, Seoul (KR); Yongho Cho, Cheongwon-gun (KR); Seunghyun Bang, Seoul (KR); HakJun Lee, Seoul (KR); Hosang Kwon, Seongnam-si (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 13/841,509

(22) Filed: Mar. 15, 2013

(65) Prior Publication Data

US 2013/0280969 A1 Oct. 24, 2013

Related U.S. Application Data

(63) Continuation of application No. 12/669,401, filed as application No. PCT/KR2008/004156 on Jul. 16, 2008.

(30) Foreign Application Priority Data

Jul. 16, 2007 (KR) .................. 10-2007-0071389
Oct. 13, 2007 (KR) .................. 10-2007-0103286
Jun. 26, 2008 (KR) .................. 10-2008-0060553

(51) Int. Cl.
*H01M 2/10* (2006.01)
*H01R 4/48* (2006.01)
*H01M 2/20* (2006.01)

(52) U.S. Cl.
CPC ............ *H01R 4/4809* (2013.01); *H01M 2/105* (2013.01); *H01M 2/1055* (2013.01); *H01M 2/204* (2013.01)

(58) Field of Classification Search
CPC ...................................................... H01M 2/204
USPC ............................................. 439/627; 3/627
See application file for complete search history.

(56) References Cited

U.S. PATENT DOCUMENTS

| 2,983,899 | A | * | 5/1961 | Amodio et al. ............... 439/786 |
| 3,783,030 | A | * | 1/1974 | Tietze ........................... 429/152 |
| 3,980,388 | A | * | 9/1976 | Nailor, III ..................... 439/752 |
| 5,250,370 | A | | 10/1993 | Faris |

(Continued)

FOREIGN PATENT DOCUMENTS

| EP | 1 953 849 A2 | 1/2008 |
| JP | 2000-106164 A | 4/2000 |

(Continued)

*Primary Examiner* — Barbara Gilliam
*Assistant Examiner* — Stephan Essex
(74) *Attorney, Agent, or Firm* — Birch, Stewart, Kolasch & Birch, LLP

(57) ABSTRACT

Disclosed herein is a battery pack constructed in a structure in which a plurality of secondary battery cells are electrically connected to one another via a connection member while the secondary battery cells are mounted in a receiving part of a pack case having no partition, wherein the connection member is located between the battery cells arranged in the longitudinal direction or in both the longitudinal direction and the lateral direction, the connection member is connected, in a mechanical coupling manner, to a lower electrode terminal of the front battery cell in the longitudinal direction and/or to an upper electrode terminal of the rear battery cell in the longitudinal direction, and the connection member is elastically pressed while the connection member is located between the battery cells.

7 Claims, 20 Drawing Sheets

(56) References Cited

U.S. PATENT DOCUMENTS

| | | | |
|---|---|---|---|
| 5,578,392 A * | 11/1996 | Kawamura | 429/99 |
| 5,659,946 A * | 8/1997 | Harima et al. | 29/623.4 |
| 5,965,292 A | 10/1999 | Kim et al. | |
| 6,627,345 B1 | 9/2003 | Zemlok et al. | |
| 6,724,170 B1 * | 4/2004 | Maggert et al. | 320/107 |
| 2005/0079408 A1 | 4/2005 | Hirano | |
| 2005/0271934 A1 | 12/2005 | Kiger et al. | |
| 2006/0127754 A1 * | 6/2006 | Hamada et al. | 429/158 |
| 2007/0126394 A1 * | 6/2007 | Kim et al. | 320/107 |

FOREIGN PATENT DOCUMENTS

| | | |
|---|---|---|
| JP | 2001-502469 A | 2/2001 |
| JP | 2002-246006 | 8/2002 |
| JP | 2006-278026 A | 10/2006 |
| JP | 2008-103302 | 5/2008 |
| KR | 10-1997-0077778 A | 12/1997 |
| KR | 10-1998-045791 A | 9/1998 |
| KR | 10-0413381 B1 | 12/2003 |
| WO | WO 2008/147153 A1 | 12/2008 |

\* cited by examiner

SECONDARY BATTERY PACK BASED ON MECHANICAL CONNECTION MANNER

CROSS-REFERENCE TO RELATED APPLICATIONS

This application is a Continuation of co-pending U.S. application Ser. No. 12/669,401 filed on Jan. 15, 2010, which is a National Stage of PCT/KR2008/004156 filed on Jul. 16, 2008, which claims priority to Korean Application No. 10-2007-0071389 filed on Jul. 16, 2007, Korean Application No. 10-2007-0103286 filed on Oct. 13, 2007 and Korean Application No. 10-2008-0060553 filed on Jun. 26, 2008. The entire contents of all of the above applications are hereby incorporated by reference.

FIELD OF THE INVENTION

The present invention relates to a secondary battery pack based on a mechanical connection manner, and, more particularly, to a battery pack constructed in a structure in which a plurality of secondary battery cells are electrically connected to one another via a connection member while the secondary battery cells are mounted in a receiving part of a pack case having no partition, wherein the connection member is located between the battery cells arranged in the longitudinal direction or in both the longitudinal direction and the lateral direction, the connection member is connected, in a mechanical coupling manner, to a lower electrode terminal of the front battery cell in the longitudinal direction and/or to an upper electrode terminal of the rear battery cell in the longitudinal direction, and the connection member is elastically pressed while the connection member is located between the battery cells.

BACKGROUND OF THE INVENTION

As mobile devices have been increasingly developed, and the demand of such mobile devices has increased, the demand of secondary batteries has also sharply increased as an energy source for the mobile devices.

Depending upon kinds of external devices in which the secondary batteries are used, the secondary batteries may be used in the form of a single battery or in the form of a battery pack having a plurality of unit cells electrically connected to one another. For example, small-sized devices, such as mobile phones, can be operated for a predetermined period of time with the power and the capacity of one battery. On the other hand, a secondary battery pack needs to be used in middle- or large-sized devices, such as laptop computers, portable digital versatile disc (DVD) players, small-sized personal computers (PCs), electric vehicles, and hybrid electric vehicles, because high power and large capacity are necessary for the middle- or large-sized devices.

The secondary battery pack is manufactured by connecting a protection circuit to a core pack having a plurality of unit cells connected in series and/or in parallel to one another. When prismatic batteries or pouch-shaped batteries are used as the unit cells, the prismatic batteries or the pouch-shaped batteries are stacked such that large-sized surfaces of the prismatic batteries or the pouch-shaped batteries face each other, and then electrode terminals of the prismatic batteries or the pouch-shaped batteries are connected to one another by connection members, such as bus bars. Consequently, when a three-dimensional secondary battery pack having a hexahedral structure is to be manufactured, the prismatic batteries or the pouch-shaped batteries are preferably used as unit cells of the secondary battery pack.

On the other hand, cylindrical batteries generally have electric capacities larger than the prismatic batteries or the pouch-shaped batteries. However, it is difficult to arrange the cylindrical batteries in a stacked structure due to the external shape of the cylindrical batteries. When the secondary battery pack is constructed generally in a line-type structure or in a plane-type structure, though, the cylindrical batteries are structurally more advantageous than the prismatic batteries or the pouch-shaped batteries.

Consequently, a secondary battery pack having a plurality of cylindrical batteries connected in series to or in parallel and series to one another is widely used in laptop computers, portable DVD players, and portable PCs. The secondary battery pack may be constructed in various core pack structures. For example, the core pack of the secondary battery pack may be generally constructed in a 2P(parallel)-3S(series) line-type structure, a 2P-3S plane-type structure, a 2P-4S line-type structure, a 2P-4S plane-type structure, a 1P-3S line-type structure, or a 1P-3S plane-type structure.

The parallel connection structure is achieved by adjacently arranging two or more cylindrical batteries in the lateral direction thereof, while electrode terminals of the cylindrical batteries are oriented in the same direction, and connecting the electrode terminals of the cylindrical batteries to one another using connection members by welding. The cylindrical batteries connected in parallel to one other may be referred to as a "bank."

The series connection structure is accomplished by arranging two or more cylindrical batteries in the longitudinal direction thereof such that electrode terminals of the cylindrical batteries having opposite polarities are successively disposed one after another, or adjacently arranging two or more cylindrical batteries in the lateral direction thereof, while electrode terminals of the cylindrical batteries are oriented in opposite directions, and connecting the electrode terminals of the cylindrical batteries to one another using connection members by welding.

The electrical connection between the cylindrical batteries is generally achieved by spot welding using thin connection members, such as metal plates (for example, nickel plates).

FIG. 1 typically illustrates a secondary battery pack constructed in a 2P-3S plane-type structure in which batteries are electrically connected to one another by spot welding. For easy understanding, the coupling between the batteries constituting the secondary battery pack of the 2P-3S plane-type structure is shown in an exploded view.

As shown in FIG. 1, three pairs of batteries 20 and 21, connected in parallel to each other for each pair, are connected in series to one another via metal plates 30 to constitute a core pack 10.

FIG. 2 is a typical view illustrating a secondary battery pack 50 after the assembly of the secondary battery pack 50 is completed. For convenience of description, a pack case is omitted.

As shown in FIG. 2, the respective batteries 20 and 21 are connected to a protection circuit module 90 via a cathode conducting wire 60 and an anode conducting wire 70 connected to the metal plates 30 and flexible printed circuit boards (FPCB) 80 connected to the conducting wires. The electrical connection between the metal plates 30 and the protection circuit module 90 is mostly achieved by soldering.

Generally, the secondary battery pack is repeatedly charged and discharged during the use of the secondary battery pack, and the secondary battery pack uses lithium secondary battery, which exhibits low safety in abnormal conditions, such as external impact, dropping, penetration of a needle-shaped body, overcharge, overcurrent, etc., as a unit cell. In order to solve such a safety-related problem, therefore, a safety element, such as a protection circuit module, is included in the secondary battery pack. The safety element acquires information, such as voltage, at a corresponding terminal connection region of the secondary battery pack to perform a predetermined safety process, thereby securing the safety of the secondary battery pack. Consequently, when the connection state of the corresponding region is variable, for example, the resistance value of the terminal connection region changes due to vibration, the detected information is inaccurate, and therefore, the safety element cannot perform the desired process. For this reason, the electrical connection between the battery cells and the protection circuit in the secondary battery pack is generally achieved by soldering.

Also, it is necessary to connect a plurality of battery cells in series or in parallel to one another to constitute a high-power, large-capacity secondary battery pack. In addition, a stable coupling method that is capable of minimizing the resistance change of the terminal connection region is required to uniformly maintain the efficiency of the secondary battery pack. Generally, the electrical connection between the battery cells is achieved by soldering or welding, preferably spot welding.

However, the welding or soldering process between the battery cells has the following problems. Specifically, the welding or soldering process requires worker's skilled technique and know-how. In addition, the control of parameters necessary to decide the intensity of welding must be continuously performed. As a result, the production process is complicated, and the production costs increase, whereby the production efficiency lowers. Also, a short circuit may occur at the welded region, due to the vibration generated from the battery pack or external impact applied to the battery pack, at the time of directly welding or soldering the battery cells. In addition, electrical or thermal damage may be caused between the battery cells and the connection members, whereby the safety of the batteries is threatened, and the defective product rate increases. Furthermore, when some of the battery cells become defective, during the manufacturing or use of the battery cells, all the battery cells constituting the battery pack must be discarded.

Consequently, there is a high necessity for a technology that is capable of substituting for the connection method based on such welding or soldering, which threatens the safety of the batteries and requires a complicated working process, and, at the same time, reusing the remaining battery cells, although some of the battery cells are defective, while stably securing the connection structure between the battery cells.

Meanwhile, for a battery pack using primary batteries, various attempts have been made to achieve the electrical connection between the respective batteries. For example, Korean Patent No. 0413381 discloses a technology for forming conductive coils at opposite ends of battery cases to electrically connect batteries to one another. U.S. Pat. No. 525,037 discloses a technology for mounting metal plates, which are bent to exhibit elasticity, at opposite ends of batteries to achieve electrical connection between the respective batteries.

However, the above-mentioned technologies have a problem in that it is required for connection members to exhibit elasticity enough to fix the battery cells and stably connect electrode terminals to one another, and therefore, connection members exhibiting low elasticity are limited in use. Especially, the technology using the conduction coils has problems in that the sectional area of a wire constituting each coil is small, and the connection length of the wire is relatively large, whereby the electrical resistance increases. The increase of the electrical resistance causes power loss and increases the amount of heat generated, whereby the stable connection between the batteries may be obstructed. On the other hand, for the technology using the metal plates that are bent to have elasticity, the metal plates may lose their elasticity or break when an excessive force is applied to the metal plates at the time of inserting the battery cells into the pack case, or when the metal plates are repeatedly used, with the result that, when external impact is applied to the battery cells, the battery cells may be separated from the pack case or the electrical connection between the battery cells may be cut off.

Furthermore, the above-mentioned connection member is limited to apply to the previously described secondary battery pack due to the variable connection state at the corresponding region.

Also, in order to achieve the electric connection between the battery cells in a mechanical contact manner, without using welding or soldering, it is required that partitions necessary to mount the connection members to the pack case be located between the battery cells, as in the conventional arts. However, the provision of the partitions increases the size of the battery pack, which is far from the latest tendency to pursue the reduction in size, weight, and thickness.

In connection with this aspect, a method may be considered of mounting mechanical contact type connection members between the battery cells at a very high elastic pressing force in a structure having no partitions. In this method, however, a material, such as polymer resin, for the pack case is slowly deformed by stress during the use of the pack case for a long period of time, which is called a creep phenomenon. Consequently, excessively high elastic pressing force of the connection members causes the occurrence of stress at the pack case, which leads to the creep phenomenon. As a result, the distance between the battery cells gradually increases, and therefore, the electrical connection between the battery cells is unstable. This phenomenon may be serious especially for a device of which the long-term use is required. Consequently, the connection method based on the primary batteries cannot be applied to a battery pack, based on secondary batteries, of which the long-term use is required through repeated charge and discharge, without any modification.

Consequently, there is a high necessity for a battery pack that is capable of substituting for the connection method based on such welding or soldering, which threatens the safety of the batteries and requires a complicated working process, not causing the increase in size of the battery pack, and stably securing the connection structure between the battery cells.

SUMMARY OF THE INVENTION

Therefore, the present invention has been made to solve the above problems, and other technical problems that have yet to be resolved.

Specifically, it is an object of the present invention to provide a connection member that is capable of stably achieving the electrical connection between two or more secondary battery cells without performing a soldering or welding process and constructed in a specific structure in which the electrical connection thereof is possible, an assembly process is easily performed, and the connection member is freely attached and detached as needed, and a secondary battery pack including the same.

It is another object of the present invention to provide a connection member that does not cause the increase in size of a battery pack and that is capable of stably maintaining the connection between the battery cells even when in use for a long period of time, and a secondary battery pack including the same.

In accordance with one aspect of the present invention, the above and other objects can be accomplished by the provision of a battery pack constructed in a structure in which a plurality of secondary battery cells are electrically connected to one another via a connection member while the secondary battery cells are mounted in a receiving part of a pack case having no partition, wherein the connection member is located between the battery cells arranged in the longitudinal direction or in both the longitudinal direction and the lateral direction, the connection member is connected, in a mechanical coupling manner, to a lower electrode terminal of the front battery cell in the longitudinal direction and/or to an upper electrode terminal of the rear battery cell in the longitudinal direction, and the connection member is elastically pressed while the connection member is located between the battery cells.

The battery pack according to the present invention does not require any partition when the connection member is mounted between the battery cells. Consequently, the size of the battery pack is not increased although the connection member is connected to the electrode terminals of the battery cells without using welding or soldering.

Also, the connection member is elastically connected to the electrode terminals of the battery cells while being somewhat pressed, and therefore, the change in resistance at the connection regions does not deviate from a desired degree of reliability although external impact is applied to the battery pack. That is, the above-described structure enables a control member, such as a battery management unit (BMU), to accurately detect the temperature and voltage of the battery cells, whereby it is possible to secure the normal operation of the battery.

On the other hand, the above-described elastically pressed state is not large enough to cause a creep phenomenon of the pack case as previously described. That is, the connection member is at least partially connected to the electrode terminals of the battery cells in a mechanical coupling manner, and therefore, it is not necessary to mount the connection member on the battery cells with a very high elastic pressing force.

Also, the battery pack according to the present invention is constructed in a structure in which it is possible to easily perform a battery pack assembly process and to achieve stable coupling between the electrode terminals of the battery cells. Furthermore, when some of the battery cells are defective during the assembly or the use of the battery pack, the battery cells may be easily separated from each other, with the result that it is possible to solve a problem in that all the battery cells constituting the battery pack will be discarded due to the defectiveness of some battery cells or the connection member.

In a preferred embodiment, the connection member is connected to the electrode terminal of one battery cell in the mechanical coupling manner and is connected to the electrode terminal of the other battery cell in a physical contact manner. A general battery cell is constructed in a structure in which one side electrode terminal protrudes but the other side electrode terminal does not protrude. Consequently, it is possible for the connection member to be connected, for example, to a protruding electrode terminal of a battery cell (a) in the mechanical coupling manner and to a non-protruding electrode terminal of another battery cell (b) in the physical contact manner.

As a concrete example, the connection member may be connected to a cathode terminal of the one battery cell in the mechanical coupling manner and may be connected to an anode terminal of the other battery cell in the physical contact manner.

In the specification, the expression "the connection in the mechanical coupling manner" means that the connection member is coupled to the electrode terminals in the mechanical coupling manner, and the expression "the connection in the physical contact manner" means that the connection member is in contact with the electrode terminals not in the mechanical coupling manner.

Consequently, in the battery pack in which the battery cells are arranged in the longitudinal direction, when one side of the connection member is connected to a lower electrode terminal of a front battery cell or an upper electrode terminal of a rear battery cell in the mechanical coupling manner, and the other side of the connection member is connected to a corresponding electrode terminal of the other battery cell in the physical contact manner, it is possible to stably maintain a coupling force between the electrode terminals of the battery cells, and, at the same time, to easily couple and separate between the battery pack and the battery cells.

Meanwhile, a general cylindrical battery, used as a unit cell of the battery pack, is constructed in a structure in which a cathode terminal of the battery cell is formed in a protruding shape to allow easy mechanical coupling between the cathode terminal of the battery cell and the connection member. Consequently, in a battery pack including battery cells each having such a protruding cathode terminal, it is preferred for the connection to be connected to a cathode terminal of one battery cell in the mechanical coupling manner and to be connected to an anode terminal of the other battery cell in the physical contact manner.

The connection member may have various structures and shapes in which the connection member is connected to the electrode terminals of the battery cells in the mechanical coupling manner.

For example, the connection member may include a coupling part configured to be variably coupled to a gas discharge port or a coupling opening formed at the cathode terminal of the battery cell. The gas discharge port or the coupling opening may be generally formed at the outside of the cathode terminal of the battery cell.

Generally, the gas discharge port may be formed at the circumference of the electrode terminal of the battery cell to discharge high-pressure gas, generated when the battery cell is abnormal, out of the battery cell. Consequently, the gas discharge port may be utilized as a coupling region.

Alternatively, the coupling opening, not the gas discharge port, may be formed at the outside of the cathode terminal as needed. The coupling opening may be formed at the central region of the electrode terminal to achieve easy coupling between the cathode terminal and the connection member. The coupling opening is constructed in a structure in which the coupling opening can be variably coupled to the coupling part of the connection member, with the result that it is possible to easily and simply achieve the coupling between the cathode terminal and the connection member, and, at the same time, to further increase the coupling force between the cathode terminal and the connection member.

The coupling part of the connection member is constructed in a structure in which the coupling part can be easily coupled to or separated from the gas discharge port or the coupling opening of the electrode terminal. Preferably, the coupling part elastically protrudes from a main body of the connection member.

In a preferred embodiment, the connection member includes one or more auxiliary connection parts connected to the electrode terminal(s) of one or both battery cells while being elastically pressed at a region(s) where the one or more auxiliary connection parts are connected in a physical contact manner. The auxiliary connection parts further increase the elastic force of the connection member. In addition, the auxiliary connection parts maintain the connection structure, and thus prevent the occurrence of an instantaneous short circuit of the electrode terminal, when an external force, such as vibration or bending, is applied to the battery pack. When the number of the auxiliary connection parts is two or more, the above-mentioned effects are more stably secured.

The connection member is more preferably used for a cylindrical battery cell constructed in a structure in which a cathode terminal protrudes from one end of the cylindrical battery cell, and an entire battery case constitutes an anode terminal in a state in which the battery case is isolated from the cathode terminal.

Also, the battery pack according to the present invention may be used as, but is not limited to, a power source for household electric appliances, such as portable DVD players and small-sized PCs.

More preferably, the battery pack according to the present invention is used as a power source for laptop computers. Consequently, the present invention provides a laptop computer including the battery pack as a power source.

In accordance with another aspect of the present invention, there is provided a connection member for electrically connecting a plurality of secondary battery cells, wherein the connection member is located between the battery cells arranged in the longitudinal direction or in both the longitudinal direction and the lateral direction, the connection member is connected, in a mechanical coupling manner, to a lower electrode terminal of the front battery cell in the longitudinal direction or to an upper electrode terminal of the rear battery cell in the longitudinal direction, and the connection member is elastically pressed while the connection member is located between the battery cells.

Since the connection member according to the present invention is constructed in a structure in which the connection member is connected to the battery cells in the mechanical coupling manner and is elastically pressed while being mounted between the battery cells, it is possible to easily perform the assembling process and to provide a stable coupling force between the electrode terminals of the battery cells.

Hereinafter, several concrete examples of the connection member will be described.

In a first embodiment, the connection member comprises a terminal connection unit for connecting the battery cells arranged in the longitudinal direction in series to each other, and the terminal connection unit comprises: (a) an outer circumferential connection part configured to correspond to the external shape of an electrode terminal of a lower battery cell, the outer circumferential connection part contacting the electrode terminal of the lower battery cell at a region adjacent to the outer circumference of the electrode terminal, the outer circumferential connection part having a predetermined width; (b) upward protruding parts tapered upward from the outer circumferential connection part toward a central axis of the terminal connection unit for elastically supporting the lower battery cell; and (c) protruding coupling parts connected to the respective upward protruding parts in a bridge structure, the protruding coupling parts protruding such that the protruding coupling parts can be elastically coupled to a predetermined region of the upper battery cell.

In a battery pack constructed in a structure in which a plurality of battery cells arranged in the longitudinal direction in series connection to each other are mounted in a pack case, it is possible for the connection member to easily electrically connect electrode terminals of the battery cells in a mechanical contact manner.

Preferably, the terminal connection unit further comprises a plurality of auxiliary connection parts tapered downward and/or upward from the inside of the outer circumferential connection part.

The auxiliary connection parts further increase the elastic force of the connection member and prevent the occurrence of an instantaneous short circuit of the electrode terminal, when an external force, such as vibration or bending, is applied to the battery pack.

Each upward-tapered auxiliary connection part is constructed in a structure in which the end of each upward-tapered auxiliary connection part is inclined toward the central axis of the connection member to a height higher than that of the outer circumferential connection part. The auxiliary connection parts extending upward to the height higher than that of the outer circumferential connection part can elastically support the upward protruding parts while the connection member is in contact with the electrode terminal of the lower battery cell. Also, the upward-tapered auxiliary connection parts remain connected to the electrode terminal of the upper battery cell. Consequently, the upward-tapered auxiliary connection parts prevent the occurrence of an instantaneous short circuit due to the unstable connection state when an external force is applied to the battery pack, as previously described. Furthermore, when the number of the upward-tapered auxiliary connection parts is two or more, the above-mentioned effects are more stably provided.

On the other hand, each downward-tapered auxiliary connection part is constructed in a structure in which the end of each downward-tapered auxiliary connection part is inclined toward the central axis of the connection member to a height lower than that of the outer circumferential connection part to obtain the above-mentioned effects.

In this case, the upward-tapered auxiliary connection parts may contact the electrode terminal of the upper battery cell (a), and the downward-tapered auxiliary connection parts may contact the electrode terminal of the lower battery cell (b).

In a second embodiment, the connection member comprises a terminal connection unit for connecting the battery cells arranged in the longitudinal direction in series to each other, a coupling opening being formed in at least one electrode terminal of the battery cells, and the terminal connection unit comprises: (a) an outer circumferential connection part configured to correspond to the external shape of an electrode terminal of a lower battery cell, the outer circumferential connection part contacting the electrode terminal of the lower battery cell at a region adjacent to the outer circumference of the electrode terminal, the outer circumferential connection part having a predetermined width; (b) upward protruding parts tapered upward from the outer circumferential connection part toward a central axis of the terminal connection unit for elastically supporting the lower battery cell; and (c) coupling parts formed on the respective upward protruding parts such that the coupling parts can be elastically coupled into the coupling opening formed in the at least one electrode terminal of the battery cells.

Consequently, the connection member forms the stable connection structure for electrical connection only through the coupling between the connection member and the electrode terminals of the battery cells, and therefore, the change in resistance at the connection regions does not deviate from a desired degree of reliability although external impact is applied to the battery pack. At the same time, it is possible to easily perform a battery pack assembly process and to achieve stable coupling between the electrode terminals of the battery cells.

Also, the coupling opening is formed in the corresponding electrode terminal of the battery cell such that the connection member can be mounted to the corresponding electrode terminal of the battery cell through the coupling opening. Consequently, applicable structures or shapes of the connection member may be further diversified, and the connection member may be constructed in a simpler structure.

For example, the connection member may be constructed in a structure in which the battery cell includes a protruding cathode terminal, and a plurality of gas discharge ports are formed at the protruding parts of the cathode terminal in the circumferential direction of the cathode terminal, and the coupling opening is formed at the central region of the cathode terminal.

The coupling opening, which is configured to be coupled to the connection member, is easily formed at the protruding cathode terminal, and therefore, the coupling opening can be easily applied to a cylindrical battery including such a protruding cathode terminal. Also, the plurality of the gas discharge ports, which are arranged about the coupling opening located at the central region of the electrode terminal in the circumferential direction thereof, effectively discharge high-pressure gas in the battery cell, as previously described, thereby securing the safety of the battery cell.

However, the coupling opening is coupled to the connection member in the mechanical coupling manner, with the result that the coupling opening is not completely sealed by the connection member. Consequently, the coupling opening may also function as the gas discharge port. In this structure, no gas discharge port may be formed at the protruding part of the cathode terminal. This structure must be interpreted to be included in the scope of the prevent invention.

The coupling opening may be constructed in various structures or shapes. For example, the coupling opening may be constructed in a cross-shaped structure in which two slits having long and short sides are formed at the central region of the outer circumference of the electrode terminal of the battery cell, on the plane of the electrode terminal of the battery cell, such that the two slits intersect at right angles.

Consequently, it is possible to easily couple battery cells to each other using a connection member including a coupling part formed in a shape corresponding to that of the long side. The coupling part of the connection member is inserted through the long side of the coupling opening, and is then rotated to a position where the coupling part of the connection member becomes parallel to the short side of the coupling opening, thereby achieving the elastic coupling between the connection member and the corresponding battery cell. Consequently, it is possible to simply and easily achieve the coupling between the connection member and the corresponding battery cell and, at the same time, the electrical connection between the connection member and the corresponding battery cell.

As another example, the coupling opening may be constructed in a structure in which two arc-shaped slits are disposed about the central axis of the electrode terminal in a symmetrical fashion.

The coupling parts, of the connection member, horizontally bent in the longitudinal direction of the slits such that the coupling parts are constructed approximately in the vertical sectional shape of "L" are inserted into the two arc-shaped slits disposed in a symmetrical fashion, and are then rotated such that the horizontally bent portions of the "L" shaped coupling parts are elastically connected to the lower end of the electrode terminal having no slits, whereby the stable coupling between the connection member and the battery cell is achieved.

The coupling parts may be bent such that ends of the coupling parts protrude upward. In this structure, the coupling parts can be easily inserted into the coupling opening of the battery cell, thereby achieving the electrical connection between the connection member and the battery cell.

Preferably, the coupling parts extend from the respective upper protruding parts, such that the coupling parts are disposed in a symmetrical fashion, whereby more elastic coupling between the coupling parts and the coupling opening of the corresponding battery cell is achieved.

The upward protruding parts extend from the upper inside and the lower inside of the outer circumferential connection part such that the upward protruding parts are tapered upward from the outer circumferential connection part toward the central axis of the connection member. Consequently, the upward protruding parts can be easily inserted into predetermined regions formed at the electrode terminal of the battery cell, and the outer circumferential connection part can elastically contact the lower battery cell.

The terminal connection unit may further comprise a plurality of auxiliary connection parts tapered downward and/or upward from the inside of the outer circumferential connection part.

In a third embodiment, the connection member comprises a terminal connection unit for connecting the battery cells arranged in the longitudinal direction in series to each other, and the terminal connection unit comprises: (a) an outer circumferential connection part configured to correspond to the external shape of an electrode terminal of a lower battery cell, the outer circumferential connection part contacting the electrode terminal of the lower battery cell at a region adjacent to the outer circumference of the electrode terminal, the outer circumferential connection part having a predetermined width; (b) upward protruding parts tapered upward from the outer circumferential connection part toward a central axis of the terminal connection unit for elastically supporting the lower battery cell; and (c) protruding coupling parts protruding from the respective upward protruding parts to a predetermined height such that the protruding coupling parts can be coupled to an electrode terminal of an upper battery cell.

Consequently, as previously described, the connection member according to the present invention does not need a welding or soldering process for electrical connection between the electrode terminals of the battery cells. The connection between the battery cells is stably maintained only by the coupling of the assembly type connection member to the battery cells. Therefore, it is possible to prevent the occurrence of short circuits of the battery cells, which may be caused during soldering or welding. Also, the change in resistance at the connection regions does not deviate from a desired degree of reliability although external impact is applied to the battery pack. At the same time, it is possible to easily perform a battery pack assembly process and to achieve stable coupling between the electrode terminals of the battery cells.

The terminal connection unit may further comprise a central connection part disposed on the central axis of the terminal connection unit such that the central connection part is depressed to a predetermined depth from the protruding coupling parts, the central connection part contacting the electrode terminal of the upper battery cell.

The shape of the protruding coupling parts is not particularly restricted so long as the protruding coupling parts are easily coupled to the predetermined regions of the electrode terminal of the battery cell. For example, the protruding coupling parts may be constructed in a structure in which two or more bridges connecting the upward protruding parts and the central connection part are arranged in a symmetrical fashion, thereby providing a high coupling force through the protruding coupling parts constructed generally in the more elastic structure.

As an example, the protruding coupling parts may be formed approximately in the vertical sectional shape of "∩" to be easily inserted into the predetermined regions of the electrode terminal of the battery cell. In this case, a process for coupling the protruding coupling parts to the predetermined regions of the electrode terminal of the battery cell is more easily carried out. After the coupling between the protruding coupling parts and the predetermined regions of the electrode terminal of the battery cell, the protruding coupling parts do not easily separate from the predetermined regions of the electrode terminal of the battery cell even due to external vibration. According to circumstances, each protruding coupling part may be provided at one side thereof with a coupling protrusion, which protrudes toward the central axis of each terminal connection unit, to further increase the coupling between the protruding coupling parts and the predetermined regions of the electrode terminal of the battery cell.

The coupling protrusion may be constructed in various structures. For example, the coupling protrusion may be constructed in a structure in which the inner end of each protruding coupling part is bent toward the corresponding auxiliary connection part, or the coupling protrusion may protrude from the inner side of each protruding coupling part in the shape of a hemispherical protrusion. However, the coupling protrusion is not limited to the above-specified structure.

Since the protruding coupling parts are constructed in a structure in which the plurality of bridges are arranged in the symmetrical fashion, and the protruding coupling parts are formed approximately in the vertical sectional shape of "∩" as previously described, elastic insertion and coupling of the protruding coupling parts are achieved irrespective of the coupling protrusions formed at the sides of the respective protruding coupling parts, at the time of coupling the protruding coupling parts to the predetermined regions of the electrode terminal of the battery cell.

According to circumstances, the connection member may further include auxiliary connection parts extending downward from the ends of the respective upward protruding parts between the respective bridges connecting the upward protruding parts and the central connection part. Consequently, as previously described, the elastic force of the upward protruding parts is further increased, and the occurrence of an instantaneous short circuit of the electrode terminal is prevented when an external force, such as vibration or bending, is applied to the battery pack.

In a fourth embodiment, the connection member comprises a terminal connection unit for connecting the battery cells arranged in the longitudinal direction in series to each other, and the terminal connection unit comprises: (a) an outer circumferential connection part configured to correspond to the external shape of an electrode terminal of a battery cell located below the connection member (a lower battery cell), the outer circumferential connection part contacting the electrode terminal of the lower battery cell at a region adjacent to the outer circumference of the electrode terminal, the outer circumferential connection part having a predetermined width; (b) an upward protruding part tapered upward from the outer circumferential connection part toward a central axis of the terminal connection unit for elastically supporting the lower battery cell; and (c) a central connection part contacting an electrode terminal of a battery cell located above the connection member (an upper battery cell), the terminal connection unit being constructed in a structure in which cut-out parts are formed at the upward protruding part and the central connection part, such that the cut-out parts extend from the upward protruding part to the central connection part and successively extend from the central connection part to the upward protruding part, to increase an elastically supporting force with respect to the electrode terminal of the battery cell.

Since the connection member is constructed in a structure in which the cut-out parts are formed at the upward protruding part and the central connection part such that the cut-out parts extend from the upward protruding part to the central connection part and successively extend from the central connection part to the upward protruding part, the elastically supporting force with respect to the electrode terminal of the battery cell is increased, and therefore, the change in resistance at the connection regions does not deviate from a desired degree of reliability although external impact is applied to the battery pack. Furthermore, it is possible to prevent the occurrence of a short circuit of the lower battery cell due to the depression of the electrode terminal of the lower battery cell.

Also, the connection member is elastically connected to the electrode terminals of the battery cells while being somewhat pressed, and the cut-out parts reduce the elasticity of the upward protruding parts, with the result that the upward protruding parts become more flexible. Consequently, the change in resistance at the connection regions does not deviate from a desired degree of reliability although external impact is applied to the battery pack.

Preferably, the central connection part has a contact interface of a size equivalent to 20% to 80% of the surface area of the electrode terminal of the upper battery cell. It is preferred to increase the size of the contact interface for surface contact when considering the resistance at the contact region; however, the increase in size of the central connection part causes the decrease in size of the outer circumferential connection part. Consequently, it is necessary for the contact interface to be within the above-specified range.

For example, the outer circumferential connection part and the central connection part may be electrically connected to the anode terminal and the cathode terminal of the battery cells, respectively, in a physical contact manner. That is, the cathode terminal of one cylindrical battery cell is electrically connected to the central connection part, which is connected to the upward protruding parts of the connection member while the central connection part is surrounded by the upward protruding parts, and the anode terminal of the other cylindrical battery cell is electrically connected to the outer circumferential connection part, which is formed, with a predetermined width, at a region adjacent to the outer circumference of the connection member.

The cut-out parts are characteristic structures that are formed at the upper protruding part and the central connection part to make the upper protruding part flexible. For example, each of the cut-out parts may be constructed in a structure in which a cut-out start point and a cut-out end point form an angle of 20 to 160 degrees under a condition that each of the cut-out parts does not reach the central axis of the connection member. Preferably, the cut-out start point and the cut-out end point form an angle of 90 degrees.

The cut-out parts may be constructed in various structures. For example, the cut-out parts may be constructed in a bridge structure. The bridge-structured cut-out parts can be easily formed at the upper protruding part and the central connection part. Also, the bridge-structured cut-out parts can effectively provide flexibility to the upper protruding part.

According to circumstances, the cut-out parts may be constructed in a structure in which each cut-out part has two or more end points with respect to one cut-out start point. In this structure, several cut-out parts are formed at the upper protruding part, whereby the upper protruding part exhibits greater flexibility.

Preferably, the distance between the central axis of the connection member and the region of each cut-out part where each cut-out part is the nearest to the central axis of the connection member is 10 to 50% of the width of the central connection part. When the distance between the central axis of the connection member and the region of each cut-out part where each cut-out part is the nearest to the central axis of the connection member is too large as compared with the width of the central connection part, the overall size of the cut-out parts decreases, with the result that the flexibility of the upper protruding part greatly decreases. On the other hand, when the distance between the central axis of the connection member and the region of each cut-out part where each cut-out part is the nearest to the central axis of the connection member is too small as compared with the width of the central connection part, the overall elasticity of the connection member excessively decreases, which is not preferred.

Meanwhile, the structure of the cut-out parts is not particularly restricted so long as the cut-out parts are constructed in a structure in which the cut-out parts extend from the upward protruding part to the central connection part and successively extend from the central connection part to the upward protruding part. Preferably, the respective cut-out parts pass through the uppermost portion of the upward protruding part. In this case, the flexibility of the upward protruding part further increases, since respective cut-out parts pass through the uppermost portion of the upward protruding part.

For example, two or more cut-out parts may be radially arranged about the central axis of the connection member in a symmetrical structure. The symmetrically radial cut-out parts are advantageous in that the symmetrically radial cut-out parts can be easily formed at the connection member. Furthermore, since the number of the cut-out parts is two or more, it is possible to control the flexibility of the upward protruding part to a desired degree.

Also, it is preferred to adjust the size of the cut-out parts in consideration of the thickness of the connection member such that the upward protruding part exhibits appropriate flexibility as well as elasticity. For example, the cut-out parts may be cut out with a width equivalent to 50 to 300% of the thickness of the connection member. The widths of the respective cut-out parts are spaces formed at the connection member by cutting out portions of the connection member. The widths of the respective cut-out parts enable the upward protruding part to exhibit appropriate flexibility as well as elasticity while preventing the deformation or the breakage of the upward protruding part.

According to circumstances, the cut-out parts may be formed at the connection member in the shape of a line or slit.

In the above-described illustrative examples of the connection member, the connection member may include two or more terminal connection units connected to each other to simultaneously achieve the connection in series between the battery cells arranged in the longitudinal direction and the connection in parallel between battery cells arranged in the lateral direction. Consequently, the connection member may be constructed in a structure that is applicable to a series-connection and parallel-connection type battery pack as well as a series-connection type battery pack.

Also, the terminal connection unit may be provided at one side thereof with a circuit connection terminal part. The circuit connection terminal part may be an input and output terminal for power supply, a detection terminal for voltage detection, or a combination thereof. The circuit connection terminal part may be formed in various shapes. For example, circuit connection terminal part may be formed in the shape of a strip extending from the outer circumferential connection part. The strip-shaped circuit connection terminal part may be bent such that the circuit connection terminal part is brought into tight contact with the side of the lower battery cell while the connection member is mounted to the lower battery cell.

In the above-described illustrative examples of the connection member, the width of the outer circumferential connection part contacting the battery cell is preferably 5 to 30% of the radius of the terminal connection unit. When the contact width of the outer circumferential connection part is less than 5%, the resistance at the contact region increases due to the small contact area. Also, the electrode terminal of the battery cell becomes out of position due to external impact, with the result that the electrical connection may be easily cut off. On the other hand, when the contact width of the outer circumferential connection part exceeds 30%, the sizes of the remaining parts, including the upward protruding parts, decrease, with the result that it is difficult to provide a predetermined elastic force, and it is difficult to couple the protruding coupling parts to the corresponding regions of the battery cell.

Also, the respective upward protruding parts preferably have a width equivalent to 20 to 60% of the radius of the terminal connection unit and a tilt angle of 5 to 30 degrees. When the width of the respective upward protruding parts is less than 20% of the radius of the terminal connection unit, it is difficult to provide a predetermined elastic force, as previously described. On the other hand, when the width of the respective upward protruding parts exceeds 60% of the radius of the terminal connection unit, the areas of the contact parts contacting the electrode terminals of the battery cells are relatively reduced, with the result that a desired electrical connection is not achieved. Also, when the tilt angle of the respective upward protruding parts is less than 5 degrees to the lower end of the terminal connection unit, i.e., the outer circumferential connection part, it is difficult to provide a predetermined elastic force against external impact. On the other hand, when the tilt angle of the respective upward protruding parts exceeds 30 degrees, the inner space of the battery pack is reduced, and the respective upward protruding parts may break when external pressure is applied to the respective upward protruding parts.

Also, the protruding coupling parts (or the coupling parts) preferably have a height equivalent to 30 to 70% of the total height of the connection member. When the height of the protruding coupling parts is less than 30%, which means that the size of the protruding regions is small, it is difficult to couple the protruding coupling parts to predetermined regions of the electrode terminal of the battery cell. On the other hand, when the height of the protruding coupling parts exceeds 70%, it is required to further increase the inner space of the battery pack, whereby the size of the battery pack increases.

Also, the auxiliary connection parts are preferably inclined upward or downward at an angle of 20 to 70 degrees to the horizontal section of the connection member. When the auxiliary connection parts are inclined at an angle of less than 20 degrees, it is difficult for the auxiliary connection parts to maintain their elasticity when the auxiliary connection parts come into contact with the electrode terminal of the battery cell. On the other hand, when the auxiliary connection parts are inclined at an angle of more than 70 degrees, the auxiliary connection parts may damage, for example scratch, the electrode terminal, or the auxiliary connection parts may break during the assembly or the use of the battery pack.

In a preferred embodiment, the connection member is characterized in that the outer circumferential connection part is further provided at the outer circumference thereof with one or more downward extensions constructed in a structure to partially cover the upper-end side of the lower battery cell. Since the downward extensions are constructed in a structure to partially cover the upper-end side of the lower battery cell, it is possible to prevent the connection member from deviating in position from the lower battery cell due to external impact, and therefore, a more stable connection is achieved.

Preferably, the one or more downward extensions are arranged along the outer circumference of the outer circumferential connection part in a symmetrical structure. Consequently, the prevention of the connection member from deviating in position from the lower battery cell and the stable connection is more effectively achieved.

The length of the downward extensions is not particularly restricted so long as the downward extensions are constructed in a structure to provide the above-mentioned effects. For example, the downward extensions may have a length equivalent to 20 to 150% of the total height of the connection member.

This structure enables the connection member to be connected to the upper battery cells and the lower battery cells in a coupling manner. That is, the protruding coupling parts of the connection member are coupled to the electrode terminal of the upper battery cell, and the downward extensions of the connection member are coupled to the electrode terminal of the lower battery cell. Consequently, the connection member is coupled to both the upper and lower battery cells.

According to circumstances, a physical contact type connection member may be further used together with the above-described illustrative examples of the connection member. The physical contact type connection member comprises terminal connection units for electrically connecting two or more battery cells arranged in the lateral direction in a physical contact manner, and each of the terminal connection units comprises: (a) an outer circumferential connection part configured to correspond to the external shape of an electrode terminal of the corresponding battery cell, the outer circumferential connection part contacting the electrode terminal of the corresponding battery cell at a region adjacent to the outer circumference of the electrode terminal, the outer circumferential connection part having a predetermined width; and (b) upward protruding parts tapered upward from the outer circumferential connection part toward a central axis of each terminal connection unit for elastically supporting the corresponding battery cell, the terminal connection units being electrically connected to each other in correspondence to the number of the battery cells arranged in the lateral direction, each of the terminal connection units being provided at one side thereof with a circuit connection terminal part.

In a battery pack constructed in a structure in which a plurality of battery cells are laterally arranged in two or more rows in a pack case while the battery cells are electrically connected to one another, it is possible for the additional connection member to easily electrically connect electrode terminals of the battery cells arranged in the lateral direction (in parallel or in series) of the ends of the battery rows in a physical contact manner.

In this case, each of the terminal connection units may further include auxiliary connection parts tapered downward from the inside of the outer circumferential connection part such that the terminal connection units can be elastically connected to the corresponding electrode terminals.

Meanwhile, the connection member, which is constructed in various structures as previously described, may be manufactured in a single body by pressing a conductive sheet. Specifically, the conductive sheet is punched or rolled according to the shape of the connection member, and therefore, it is possible to easily and simply manufacture the connection member having a specific structure.

Preferably, the connection member is used especially for cylindrical battery cells. In this case, the specific regions of the connection member are generally constructed in a concentric circle structure, which corresponds to the shape of the electrode terminal of each cylindrical battery cell, with the result that the contact area therebetween is maximized.

In accordance with another aspect of the present invention, there is provided a battery pack constructed in a structure in which the connection member is mounted between electrode terminals of battery cells to achieve the electrical connection between the battery cells.

The battery pack may be constructed in a structure in which a plurality of battery cells are electrically connected to one another in rows in a pack case. The number of the rows may be one or more.

The connection member may be used to electrically connect the battery cells arranged in the longitudinal direction in each row. In a structure including two or more battery rows, the connection member may be used to electrically connect the battery cells (bank) arranged in the lateral direction.

When the connection member is used only for the electrical connection of the bank, for example, the battery pack may be manufactured in a structure in which battery cells are mounted in a pack case including receiving parts constructed such that two or more secondary battery cells are mounted in the respective receiving parts while being adjacent to each other in the lateral direction, and the connection member is coupled to a sidewall contacting electrode terminals of the battery cells, among sidewalls constituting the pack case, such that the outer circumferential connection parts of the connection member is directed toward the electrode terminals of the battery cells.

The battery pack according to the present invention may be used as, but is not limited to, a power source for household electric appliances, such as portable DVD players, small-sized PCs, etc., requiring high power and large capacity.

More preferably, the battery pack according to the present invention is used as a power source for laptop computers. In accordance with a further aspect of the present invention, therefore, there is provided a laptop computer including the battery pack as a power source.

The general structure of the laptop computers and a method of manufacturing the same are well known in the art to which the present invention pertains, and therefore, a further description thereof will not be given.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
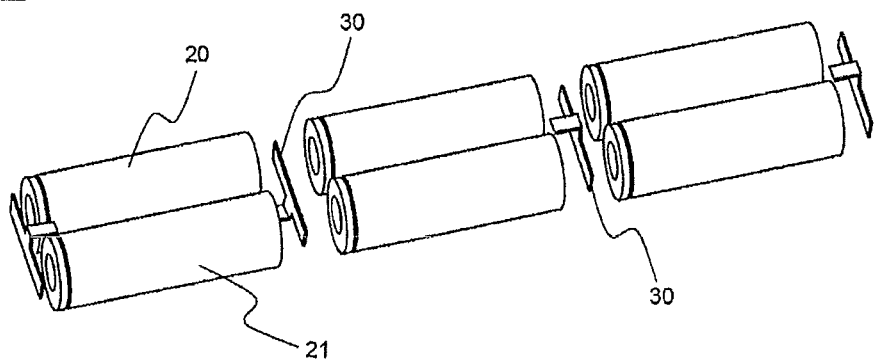
FIG. 1 is an exploded perspective view illustrating the coupling between batteries electrically connected to each other by conventional connection members, such as metal plates.
Figure 2:
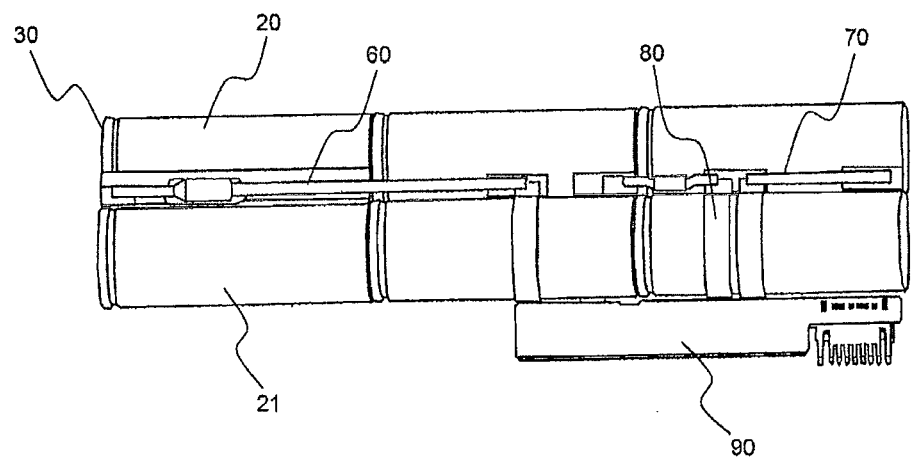
FIG. 2 is a typical view illustrating a battery pack in which the metal plates are connected to a protection circuit.
Figure 3:
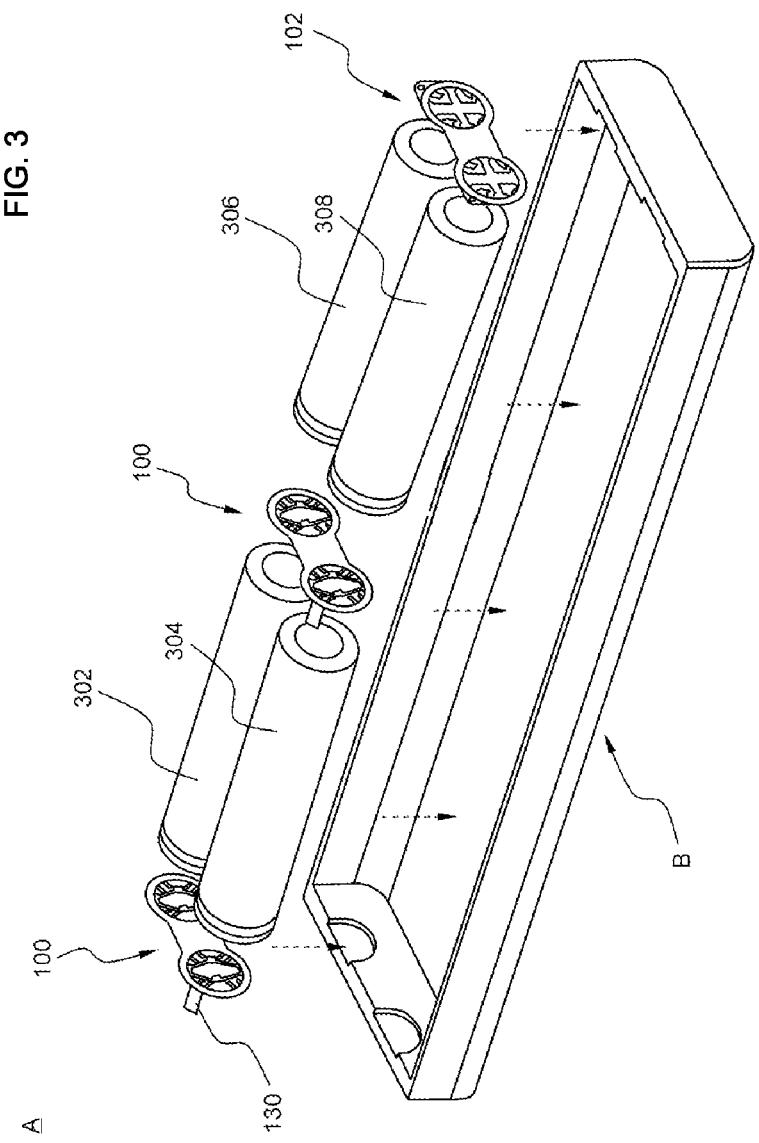
FIGS. 3 and 4 are typical views illustrating a process for assembling a secondary battery pack according to the present invention.
Figure 4:
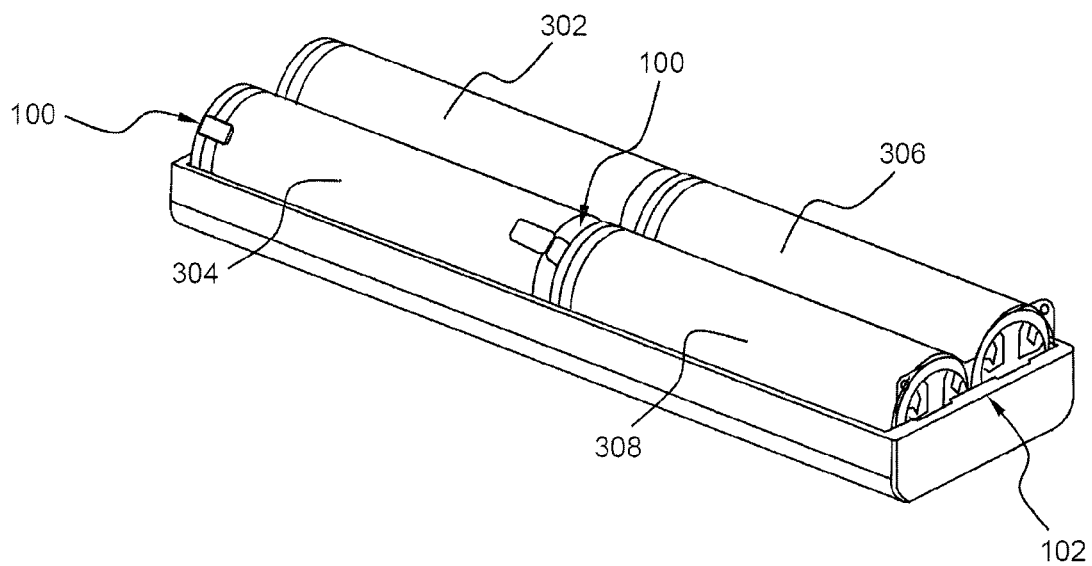

FIGS. 3 and 4 are typical views illustrating a process for assembling a secondary battery pack according to the present invention.

Referring to these drawings, the battery pack A is constructed in a structure in which a plurality of cylindrical batteries 302, 304, 306, and 308 are electrically connected to one another via predetermined connection members 100 and 102 in a pack case B having no partition.

Specifically, two kinds of connection members 100 and 102 and four cylindrical batteries 302, 304, 306, and 308 are located in a receiving part of the pack case B, while the four cylindrical batteries 302, 304, 306, and 308 are brought into tight contact with one another, such that cathode terminals are connected to protruding coupling parts 130 of the connection members 100 in a mechanical coupling manner.

Consequently, the cathode terminals of the cylindrical batteries 302 and 304 are connected to the connection members 100 having the protruding coupling parts 130 in a mechanical coupling manner, while the cathode terminals of the cylindrical batteries 302 and 304 are elastically pressed, and anode terminals of the cylindrical batteries 302 and 304 are connected to the connection members 100 in a physical connection manner, whereby it is possible to easily assembly the battery pack and stably maintain the connection structure between the electrode terminals of the battery cells.

Also, the connection member 102, which includes no protruding coupling part 130, is mounted at the region where anode terminals of the cylindrical batteries 306 and 308 come into contact with the pack case, whereby the anode terminals of the cylindrical batteries 306 and 308, arranged in the lateral direction, are electrically connected in parallel to each other.

The structure of the secondary battery pack A after the assembly is shown in FIG. 4. Referring to FIG. 4, the second battery pack A is constructed in a 2P-2S plane-type structure in which the two cylindrical batteries 302 and 304 are arranged in contact with each other in the lateral direction, and, at the same time, the two cylindrical batteries 302 and 306 are arranged in the longitudinal direction.

Figure 5:
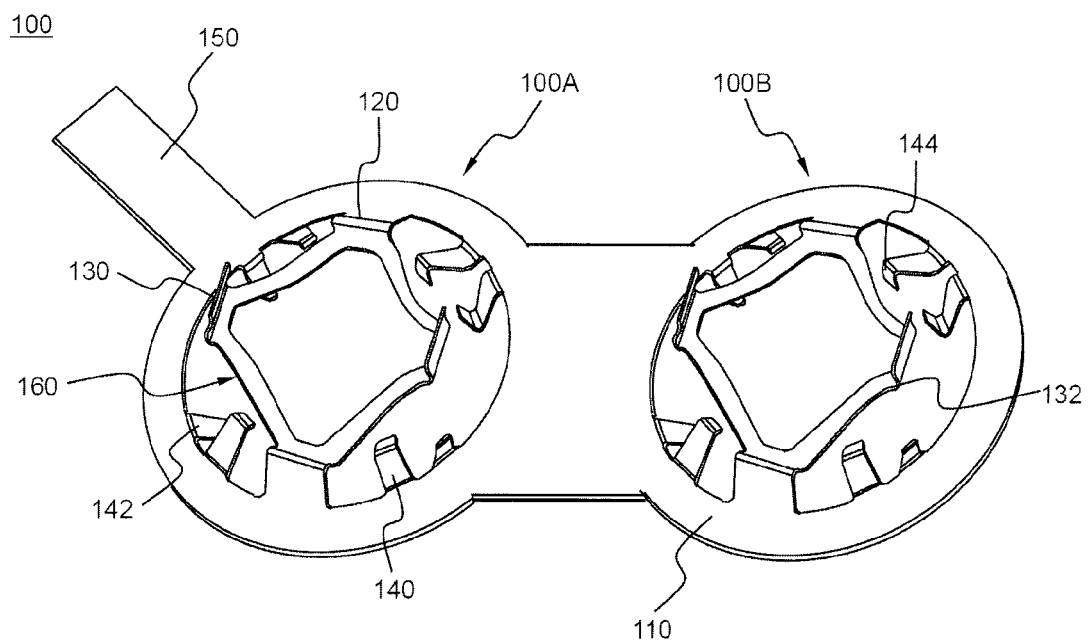
FIG. 5 is a perspective view illustrating a cathode terminal connection member according to a first preferred embodiment of the present invention.
Figure 6:
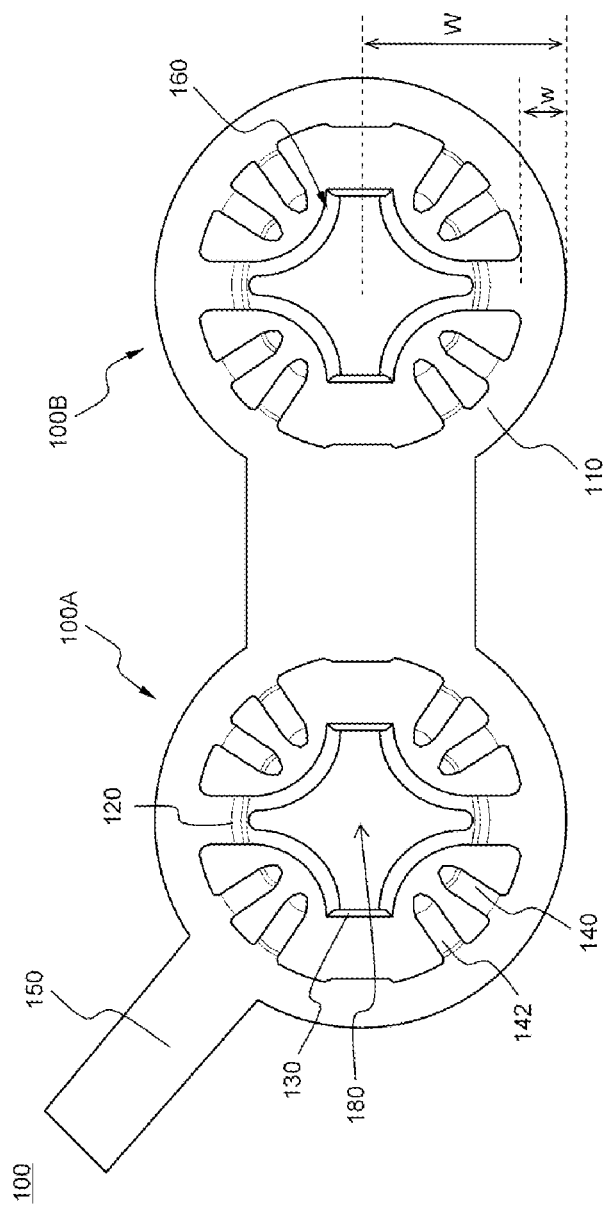
FIG. 6 is a typical plan view of the cathode terminal connection member according to the first preferred embodiment of the present invention.

FIG. 5 is a perspective view typically illustrating a cathode terminal connection member according to a first preferred embodiment of the present invention, and FIG. 6 is a typical plan view of the cathode terminal connection member according to the first preferred embodiment of the present invention.

Referring to these drawings, the connection member 100 according to the present invention is constructed in a structure in which two terminal connection units 100A and 100B are connected to each other, and a circuit connection terminal part 150 for connection to an external circuit is included in the connection member 100.

Each of the terminal connection units 100A and 100B includes an outer circumferential connection part 110, having a predetermined width w, electrically connected to an electrode terminal of a lower battery cell (not shown), upward protruding parts 120 extending from the outer circumferential connection part 110 toward a central axis 180 of each terminal connection unit such that the upward protruding parts 120 are tapered upward, protruding coupling parts 130 connected to the respective upward protruding parts 120 via bridges 160 while protruding upward, and auxiliary connection parts 140 and 142 tapered upward and downward, respectively, from the inside of the outer circumferential connection part 110.

The width w of the outer circumferential connection part 110 contacting the electrode terminal of the lower battery cell is approximately 10% of the radius W of each terminal connection unit. The outer circumferential connection part 110 is formed in the shape of a concentric circle corresponding to the outside of the electrode terminal of the lower battery cell.

The protruding coupling parts 130 have a height equivalent to approximately 50% of the total height of the connection member 100. The top of each upward protruding part 120 is formed approximately in the vertical sectional shape of "∩." Also, each protruding coupling part 130 is provided at the inside thereof with a coupling protrusion 132, which protrudes toward the central axis 180 of the terminal connection unit. The coupling protrusion 132 of each protruding coupling part 130 prevents the connection member from separating from the upper battery cell after the connection member is coupled to a predetermined region of the electrode terminal of the upper battery cell. At this time, the upward protruding parts 120 and the bridges 160 contact the central region of the electrode terminal of the upper battery cell, whereby the electrical connection is achieved.

The four bridges 160 connecting the protruding coupling parts 130 and the upward protruding parts 120 are radially arranged in a symmetrical structure. Specifically, the bridges 160, arranged at predetermined intervals, connect the upward protruding parts 120 and the protruding coupling parts 130. The bridges 160 protrude upward.

Also, the four auxiliary connection parts 140 are inclined upward from the outer circumferential connection part 110 by a height of approximately 1 mm in a space defined between the respective bridges 160 and the outer circumferential connection part 110. The other four auxiliary connection parts 142 are tapered downward from the outer circumferential connection part 110 by a height of approximately 1 mm. Ends of the respective auxiliary connection parts 140 are bent downward, i.e., in the direction opposite to the upward taper direction of the corresponding auxiliary connection parts, and ends of the respective auxiliary connection parts 142 are bent upward, i.e., in the direction opposite to the downward taper direction of the corresponding auxiliary connection parts. Consequently, when the connection member 100 is mounted to the cathode or anode terminals of the lower battery cell (not shown), the auxiliary connection parts 140 and 142 are connected to the electrode terminals of the lower battery cells or the upper battery cells while being elastically pressed.

Although the auxiliary connection parts 140 and 142 exhibit somewhat low modulus of elasticity, the four auxiliary connection parts 140 and the four auxiliary connection parts 142 are independently connected to the electrode terminal of the lower battery cell. Consequently, the auxiliary connection parts 140 and 142 prevent the occurrence of an instantaneous short circuit of the battery cell due to an external factor, such as vibration, thereby continuously maintaining the electrical connection between the battery cells.

Also, as shown in FIG. 6, the outer circumferential connection part 110 of each terminal connection unit is formed in the shape of a concentric circle. Furthermore, the two upward protruding parts 120 and the two protruding coupling parts 130 form an imaginary concentric circle when the two upward protruding parts 120 and the two protruding coupling parts 130 are connected to one another. Consequently, the respective terminal connection units are constructed generally in a concentric circle structure, and therefore, the contact area and the tight contact degree between the respective terminal connection units and the outer circumferences of the electrode terminals of cylindrical battery cells increase.

Figure 7:
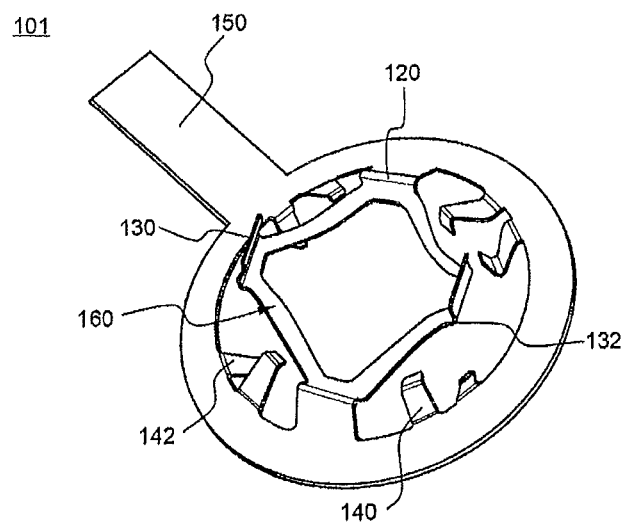
FIG. 7 is a perspective view illustrating a cathode terminal connection member according to a modification of FIG. 5.
Figure 8:
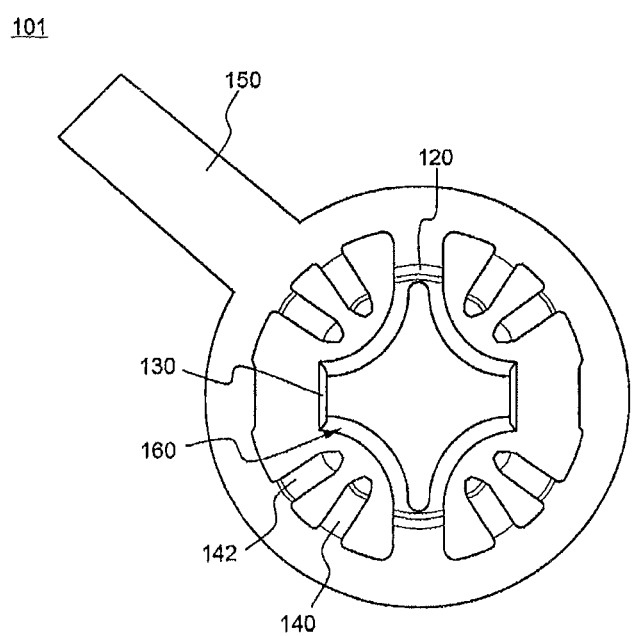
FIG. 8 is a typical plan view of the cathode terminal connection member according to the modification of FIG. 5.

FIG. 7 is a perspective view illustrating a cathode terminal connection member according to a modification of FIG. 5, and FIG. 8 is a typical plan view of the cathode terminal connection member according to the modification of FIG. 5.

The connection member 101 of FIGS. 7 and 8 is identical in construction to the connection member of FIGS. 5 and 6 except that the connection member 101 of FIGS. 7 and 8 includes a single terminal connection unit. That is, the terminal connection unit of the connection member 101 of FIGS. 7 and 8 includes an outer circumferential connection part 110, upward protruding parts 120, protruding coupling parts 130 and 132, and auxiliary connection parts 140 and 142, a circuit connection terminal part 150, and bridges 160, all of which are identical to those of FIGS. 5 and 6. Accordingly, a detailed description of the same components will not be given.

Figure 9:
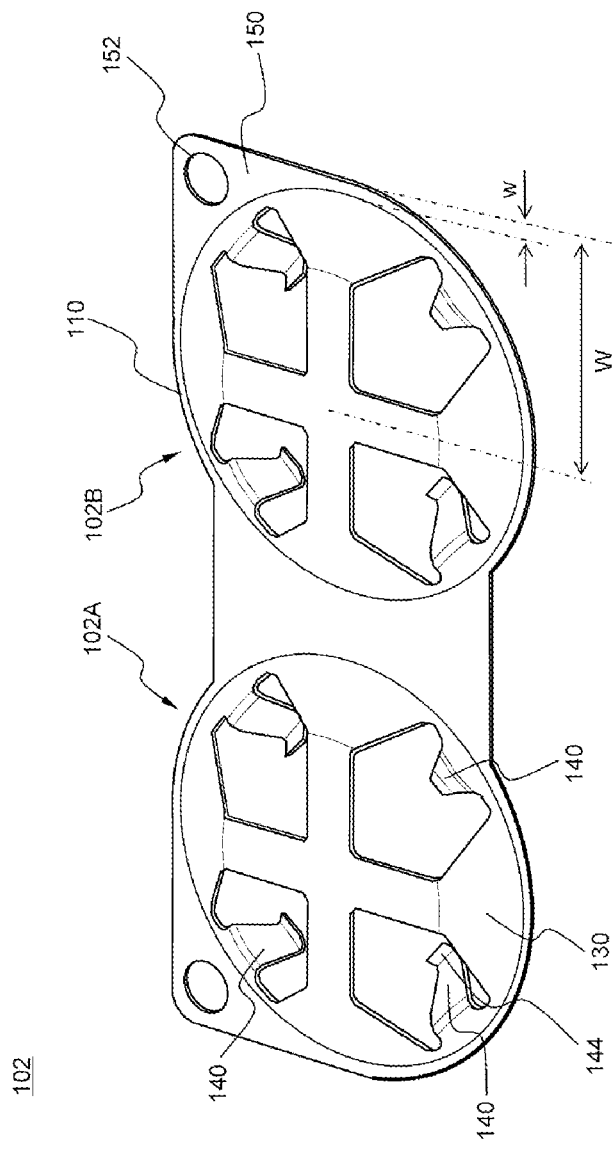
FIG. 9 is a perspective view illustrating an anode terminal connection member that can be used in the present invention.
Figure 10:
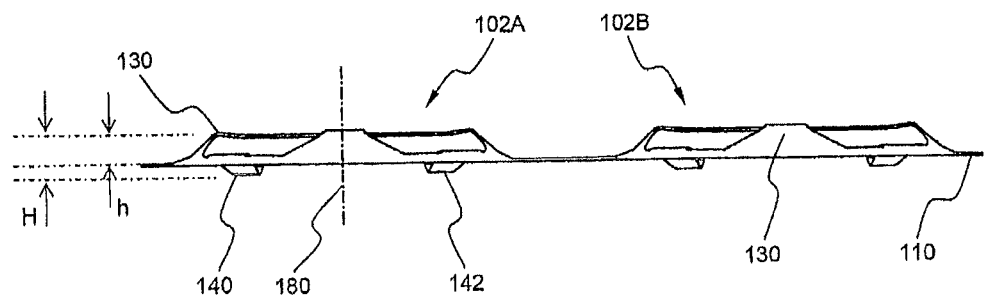
FIG. 10 is a typical front view of the anode terminal connection member that can be used in the present invention.

FIG. 9 is a perspective view typically illustrating an anode terminal connection member that can be used together with the connection member according to the present invention, and FIG. 10 is a typical front view of the anode terminal connection member.

Referring to these drawings, the connection member 102 according to the present invention is constructed in a structure in which two terminal connection units 102A and 102B are connected to each other, and the connection member is provided at one side thereof with a side extension part 150 where a circuit connection terminal part 152 for connection to an external circuit is formed.

Each of the terminal connection units 102A and 102B includes an outer circumferential connection part 110, having a predetermined width w, electrically connected to an electrode terminal of a lower battery cell (not shown), upward protruding parts 130 extending from the outer circumferential connection part 110 toward a central axis 180 of each terminal connection unit such that the upward protruding parts 130 are tapered upward, the upward protruding parts 130 being connected to one another via bridges, and auxiliary connection parts 140 tapered downward from the inside of the outer circumferential connection part 110.

The width w of the outer circumferential connection part 110 contacting the electrode terminal of the lower battery cell is approximately 10% of the radius W of each terminal connection unit. The outer circumferential connection part 110 is formed in the shape of a concentric circle corresponding to the outside of the electrode terminal of the lower battery cell.

The upward protruding parts 130 have a height h equivalent to approximately 60% of the total height H of the connection member 102. The four bridges interconnecting the upward protruding parts 130 are symmetrically arranged in a cross-shaped structure.

Also, the four auxiliary connection parts 140, which are arranged radially about the central axis 180 of each terminal connection unit in a symmetrical structure, are tapered downward from the outer circumferential connection part 110 in a space defined between the respective upward protruding parts 130 and the outer circumferential connection part 110. Ends 144 of the respective auxiliary connection parts 140 are bent upward, i.e., in the direction opposite to the downward taper direction of the corresponding auxiliary connection parts. Consequently, when the connection member 102 is mounted to the anode terminals of the lower battery cells (not shown), the auxiliary connection parts 140 are connected to the electrode terminals of the battery cells located below the connection member 102 while being elastically pressed.

Although the auxiliary connection parts 140 exhibit somewhat low modulus of elasticity, the four auxiliary connection parts 140 are independently connected to the electrode terminal of the lower battery cell. Consequently, the auxiliary connection parts 140 prevent the occurrence of an instantaneous short circuit of the battery cell due to an external factor, such as vibration, thereby continuously maintaining the electrical connection between the battery cells.

Also, the outer circumferential connection part 110 of each terminal connection unit is formed generally in the shape of a circle. Furthermore, the four upward protruding parts 130 and the four auxiliary connection parts 140 form an imaginary concentric circle when the four upward protruding parts 130 and the four auxiliary connection parts 140 are connected to one another. Consequently, the respective terminal connection units are constructed generally in a concentric circle structure, and therefore, the contact area and the tight contact degree between the respective terminal connection units and the outer circumferences of the electrode terminals of cylindrical battery cells increase.

Figure 11:
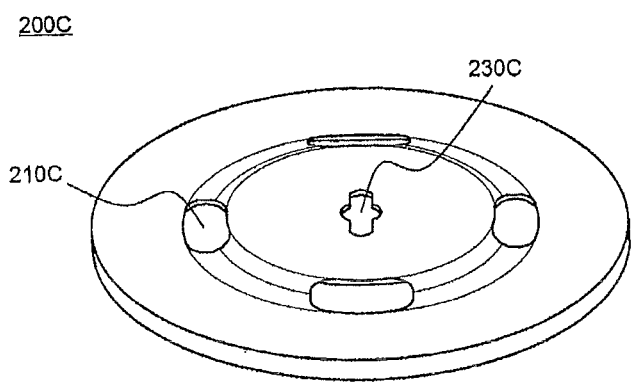
FIGS. 11 and 12 are perspective views illustrating electrode terminals having coupling openings, respectively, according to preferred embodiments of the present invention.
Figure 12:
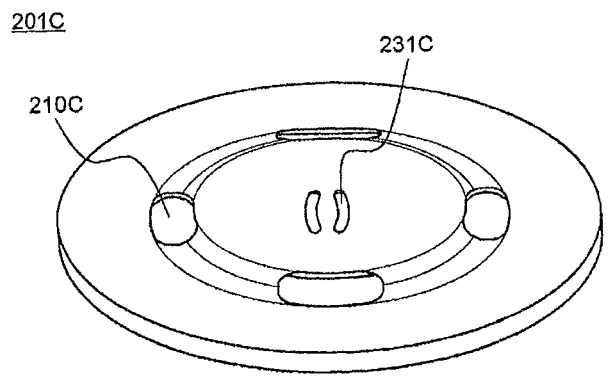

FIGS. 11 and 12 are perspective views typically illustrating electrode terminals having coupling openings, respectively, according to preferred embodiments of the present invention.

Referring to these drawings, the electrode terminal 200C; 201C has gas discharge ports 210C formed at a protrusion thereof in the circumferential direction. The electrode terminal 200C; 201C is provided at the central region thereof with a coupling opening 230C; 231C in which an electrical connection member is coupled in a mechanical coupling manner. However, when the coupling opening 230C; 231C also functions as a gas discharge port, as previously described, it is not necessary to additionally form the gas discharge ports 210C.

The coupling opening 230C is formed, for example, approximately in a cross-shaped structure (see the structure of the electrode terminal 200C), and the coupling opening 231C is formed, for example, in a structure in which two arc-shaped slits are disposed in a symmetrical fashion (see the structure of the electrode terminal 201C). Consequently, the electrical connection member and the coupling parts thereof may be formed in various structures depending upon the structure or the shape of the coupling opening 230C; 231C of the electrode terminal.

Specifically, coupling parts formed in a shape corresponding to the shape of a long side of the approximately cross-shaped coupling opening 230C are inserted into the coupling opening 230C of the electrode terminal, and are then rotated 90 degrees, whereby the elastic coupling between the electrical connection member and the electrode terminal 200C is achieved.

On the other hand, coupling parts horizontally bent in the longitudinal direction of the slits such that the coupling parts are constructed approximately in the vertical sectional shape of "L" are inserted into the coupling opening 231C constructed in a structure in which the two arc-shaped slits are disposed in a symmetrical fashion, and are then rotated in the direction in which the coupling parts are bent, whereby the elastic coupling between the electrical connection member and the electrode terminal is achieved.

Figure 13:
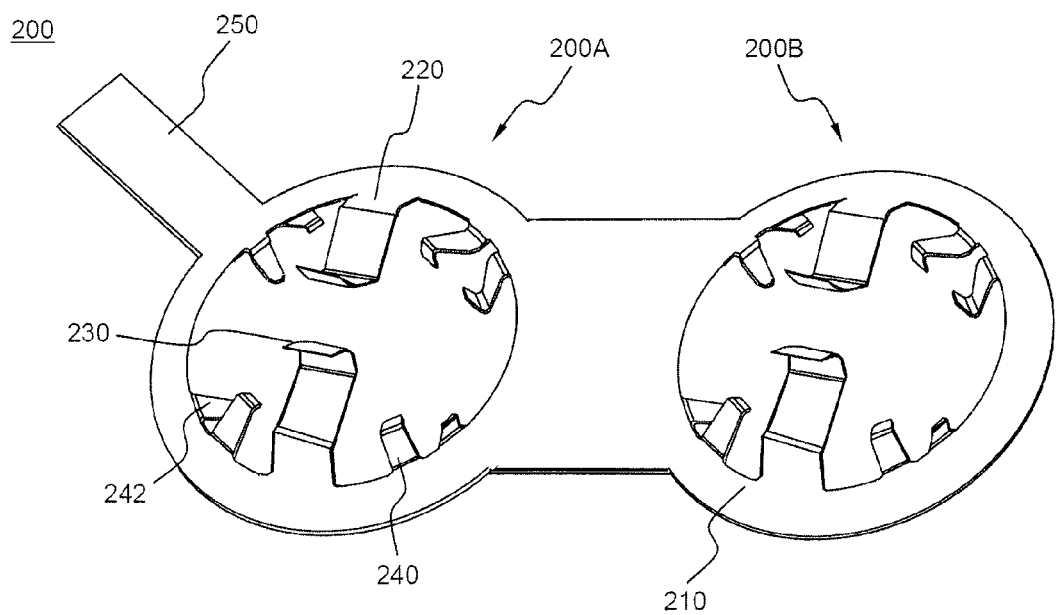
FIG. 13 is a perspective view illustrating a connection member according to a second preferred embodiment of the present invention.
Figure 14:
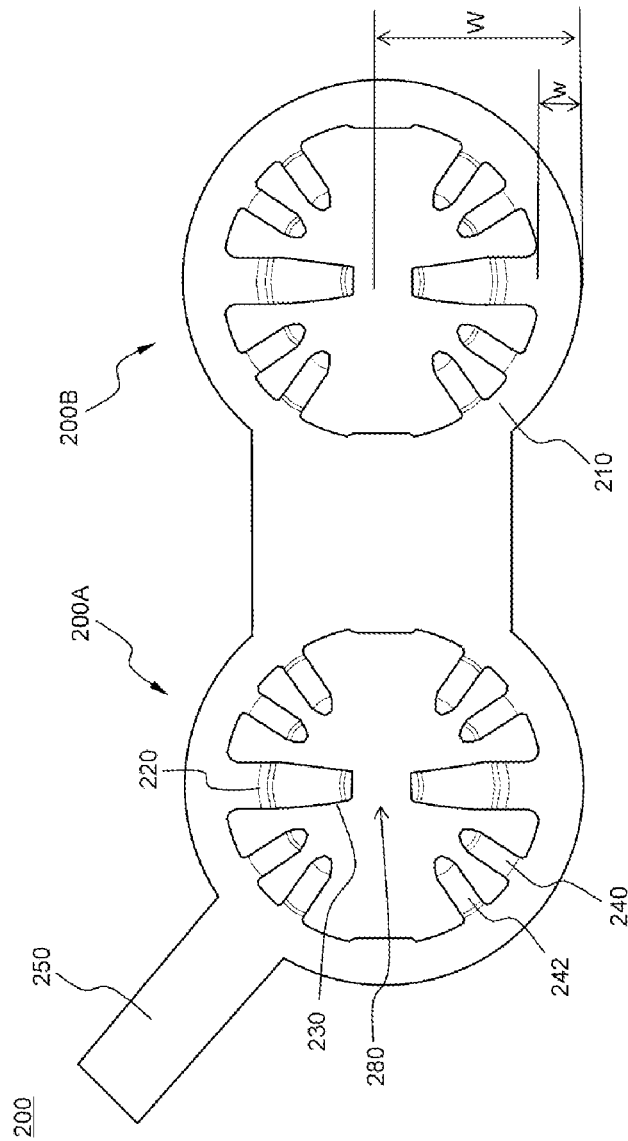
FIG. 14 is a typical plan view of the connection member according to the second preferred embodiment of the present invention.

FIG. 13 is a perspective view typically illustrating a connection member according to a second preferred embodiment of the present invention, and FIG. 14 is a typical plan view of the connection member according to the second preferred embodiment of the present invention.

Referring to these drawings, the connection member 200 according to the present invention is constructed in a structure in which two terminal connection units 200A and 200B are connected to each other, and a circuit connection terminal part 250 for connection to an external circuit is included in the connection member 200.

Each of the terminal connection units 200A and 200B includes an outer circumferential connection part 210, having a predetermined width w, electrically connected to an electrode terminal of a lower battery cell (not shown), coupling parts 230 formed on upward protruding parts 220 tapered upward from the outer circumferential connection part 210 toward a central axis 280 of each terminal connection unit, and auxiliary connection parts 240 and 242 tapered upward and downward, respectively, from the inside of the outer circumferential connection part 210.

The width w of the outer circumferential connection part 210 contacting the electrode terminal of the lower battery cell is approximately 10% of the radius W of each terminal connection unit. The outer circumferential connection part 210 is formed in the shape of a concentric circle corresponding to the outside of the electrode terminal of the lower battery cell.

The coupling parts 230 are constructed in a structure in which ends of the respective coupling parts 230 are bent outward. Consequently, when the coupling parts 230 are inserted into the coupling opening 230C of the electrode terminal 200C as shown in FIG. 11 and are then rotated, the electrical connection between the connection member and the electrode terminal is achieved while the coupling between the connection member and the electrode terminal is securely maintained.

Also, the four auxiliary connection parts 240 are inclined upward from the outer circumferential connection part 210 by a predetermined height, and the other four auxiliary connection parts 242 are tapered downward from the outer circumferential connection part 210 by a predetermined depth. Ends of the respective auxiliary connection parts 240 are bent downward, i.e., in the direction opposite to the upward taper direction of the corresponding auxiliary connection parts, and ends of the respective auxiliary connection parts 242 are bent upward, i.e., in the direction opposite to the downward taper direction of the corresponding auxiliary connection parts. Consequently, when the connection member 200 is mounted to the cathode or anode terminals of the lower battery cell (not shown), the auxiliary connection parts 240 and 242 are connected to the electrode terminals of the lower battery cells or the upper battery cells while being elastically pressed.

Although the auxiliary connection parts 240 and 242 exhibit somewhat low modulus of elasticity, the four auxiliary connection parts 240 and the four auxiliary connection parts 242 are independently connected to the electrode terminal of the lower battery cell. Consequently, the auxiliary connection parts 240 and 242 prevent the occurrence of an instantaneous short circuit of the battery cell due to an external factor, such as vibration, thereby continuously maintaining the electrical connection between the battery cells.

Also, as shown in FIG. 13, the outer circumferential connection part 210 of each terminal connection unit is formed in the shape of a concentric circle. Consequently, the contact area and the tight contact degree between the respective terminal connection units and the outer circumferences of the electrode terminals of cylindrical battery cells increase.

Figure 15:
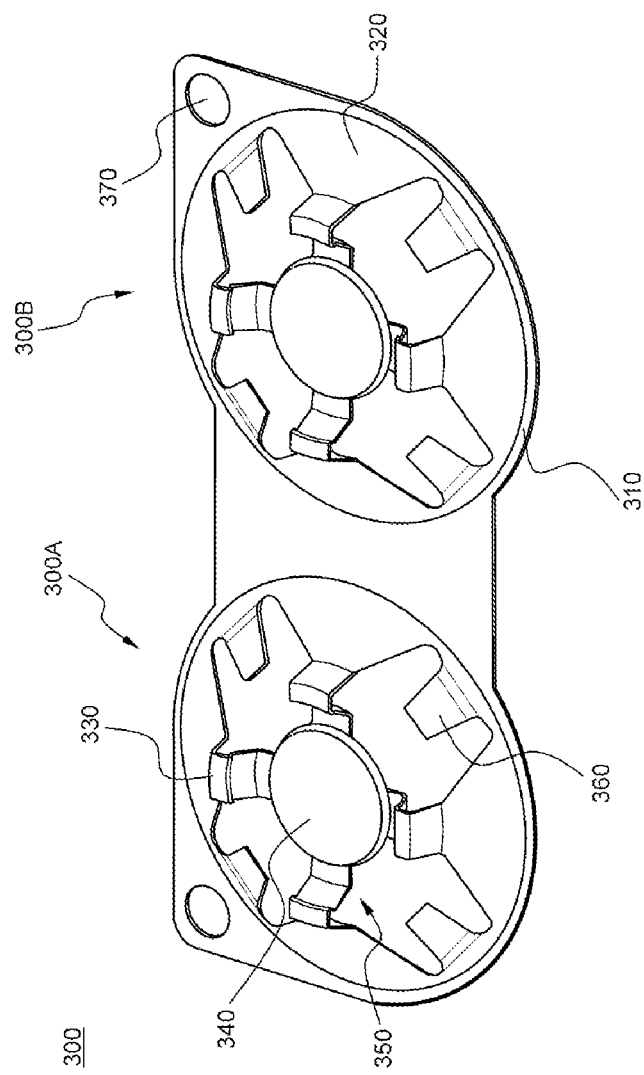
FIG. 15 is a perspective view illustrating a connection member according to a third preferred embodiment of the present invention.
Figure 16:
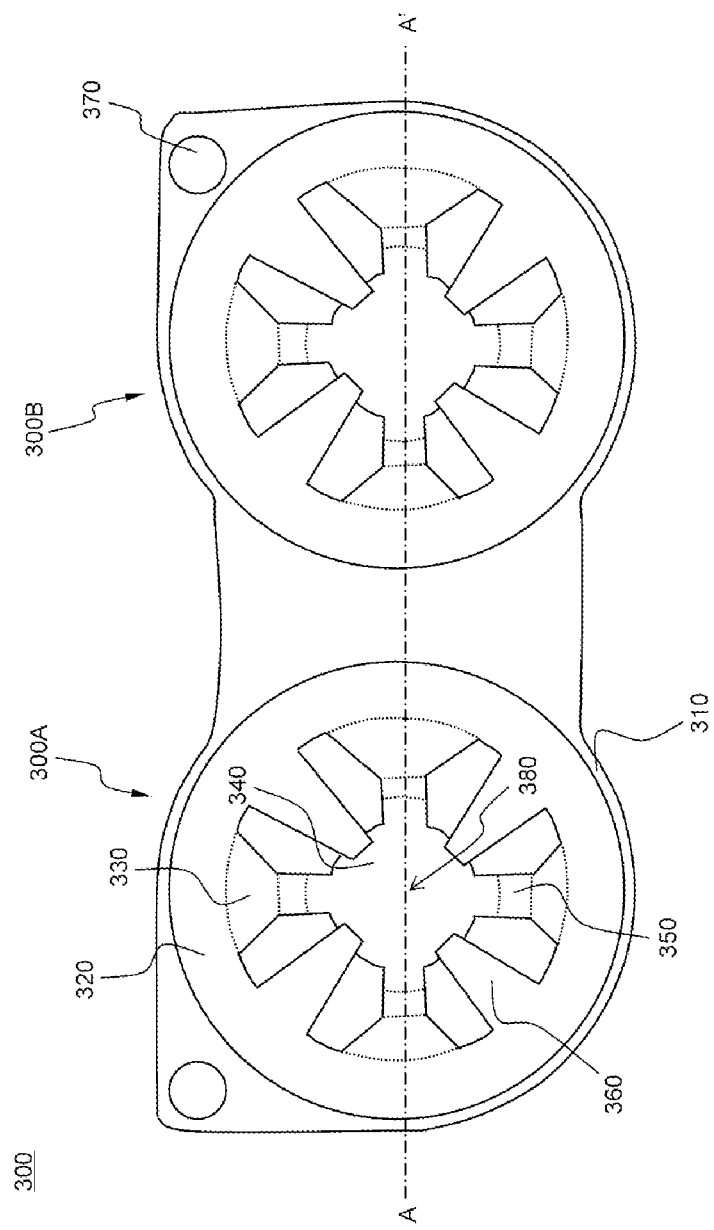
FIG. 16 is a typical plan view of the connection member according to the third preferred embodiment of the present invention illustrating the bottom of the connection member.
Figure 17:
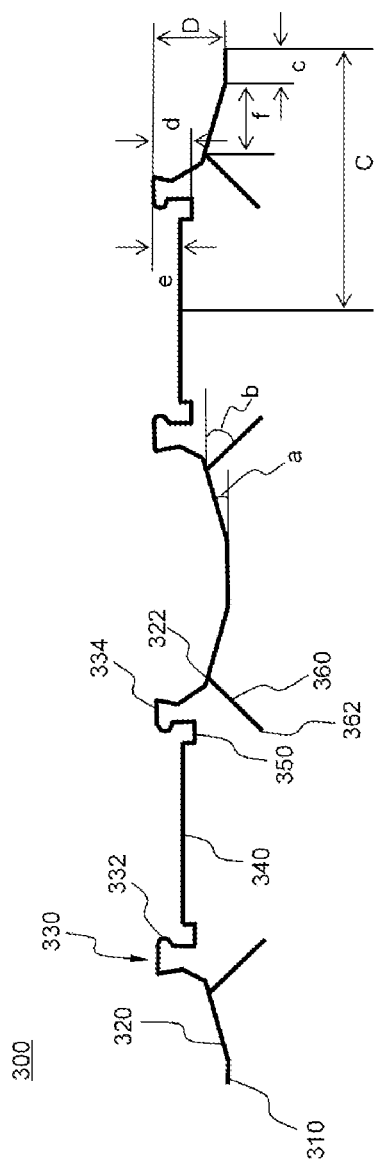
FIG. 17 is a typical sectional view taken along line A-A' of FIG. 16.

FIG. 15 is a perspective view illustrating a connection member according to a third preferred embodiment of the present invention, FIG. 16 is a typical plan view of the connection member according to the third preferred embodiment of the present invention illustrating the bottom of the connection member, and FIG. 17 is a typical sectional view taken along line A-A' of FIG. 16.

Referring to these drawings, the connection member 300 according to the present invention includes two terminal connection units 300A and 300B connected to each other and circuit connection terminal parts 370 for connection to an external circuit.

Each of the terminal connection units 300A and 300B includes an outer circumferential connection part 310 electrically connected to an electrode terminal of a lower battery cell (not shown), the outer circumferential connection part 310 having a predetermined width c, upward protruding parts 320 extending from the outer circumferential connection part 310 toward a central axis 380 of each terminal connection unit such that the upward protruding parts 320 are tapered upward, protruding coupling parts 330 protruding upward from the respective upward protruding parts 320 to a predetermined height d, and a central connection part 340 disposed on the central axis 380 of each terminal connection unit such that the central connection part 340 is depressed to a predetermined depth e from upper end surfaces 334 of the respective protruding coupling parts 330, the central connection part 340 being electrically connected to an electrode terminal of an upper battery cell (not shown).

The width c of the outer circumferential connection part 310 contacting the electrode terminal of the lower battery cell is approximately 10% of the radius C of each terminal connection unit. The outer circumferential connection part 310 is formed in the shape of a concentric circle corresponding to the outside of the electrode terminal of the lower battery cell.

The respective upward protruding parts 320 have a width f equivalent to approximately 30% of the radius C of each terminal connection unit. The respective upward protruding parts 320 are tapered upward at a tilt angle a of 10 degrees toward the central axis 380 of each terminal connection unit from the outer circumferential connection part 310. Consequently, the elastic connection between the outer circumferential connection part 310 and the electrode terminal of the lower battery cell is maintained by the upward protruding parts 320.

The height d of the respective protruding coupling parts 330 is approximately 50% of the total height D of the connection member 300. The respective protruding coupling parts 330 are formed approximately in the vertical sectional shape of "∩" Also, each protruding coupling part 330 is provided at the inside thereof with a coupling protrusion 332, which protrudes toward the central axis 380 of each terminal connection unit. The coupling protrusion 332 is constructed in a structure in which the inner end of each protruding coupling part 330 is bent toward the central connection part 340. Consequently, the structure of the protruding coupling parts 330 prevents the connection member from separating from the upper battery cell after the connection member is coupled to a predetermined region of the electrode terminal of the upper battery cell. At this time, the central connection part 340 contacts the central region of the electrode terminal of the upper battery cell, whereby the electrical connection is achieved.

The protruding coupling parts 330 are constructed in a structure in which four bridges 350 connecting the respective upward protruding parts 320 and the central connection part 340 are radially arranged in a symmetrical fashion. Specifically, the bridges 350, arranged at predetermined intervals, connect the respective upward protruding parts 320 and the central connection part 340. The bridges 350 protrude upward to constitute the respective protruding coupling parts 330.

Also, four auxiliary connection parts 360 extend from ends 322 of the respective upward protruding parts 320 between the respective bridges 350. The auxiliary connection parts 360 are inclined at a tilt angle b of approximately 40 degrees toward the central axis 380 of each terminal connection unit. Lower ends 362 of the respective auxiliary connection parts 360 extend to a height lower than that of the outer circumferential connection part 310. Consequently, when the connection member 300 is mounted to the anode terminal of the lower battery cell (not shown), the auxiliary connection parts 360 are connected to the electrode terminal of the lower battery cell while being elastically pressed.

Although the auxiliary connection parts 360 exhibit somewhat low modulus of elasticity, the four auxiliary connection parts 360 are independently connected to the electrode terminal of the lower battery cell. Consequently, the downward protrusions 160 prevent the occurrence of an instantaneous short circuit of the battery cell due to an external factor, such as vibration, thereby continuously maintaining the electrical connection between the battery cells.

Also, as shown in FIG. 16, the upward protruding parts 320, the outer circumferential connection part 310, and the central connection part 340 of each terminal connection unit are formed in the shape of a concentric circle. Furthermore, the four protruding coupling parts 330 are formed in the shape of an imaginary concentric circle when the protruding coupling parts 330 are connected to one another. Consequently, each terminal connection unit is constructed in a concentric circle structure, and therefore, the contact area and the tight contact degree between the respective terminal connection units and the outer circumferences of the electrode terminals of cylindrical battery cells increase.

Figure 18:
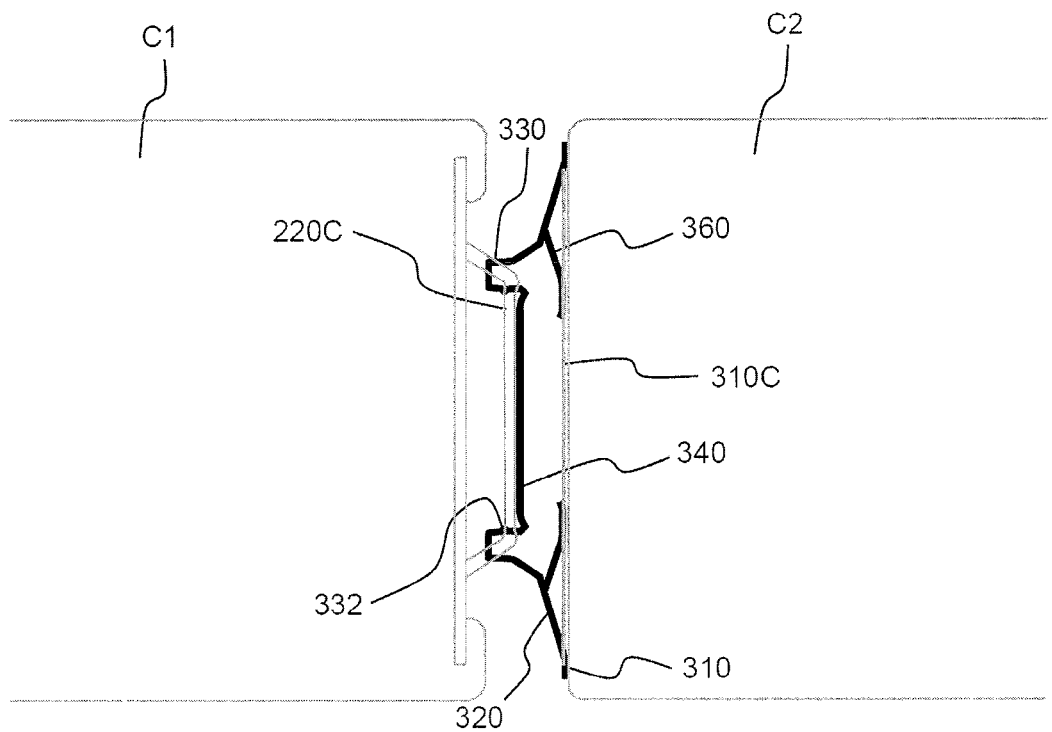
FIG. 18 is a side view typically illustrating the coupling between the connection member of FIG. 15 and electrode terminals of cylindrical battery cells.
Figure 19:
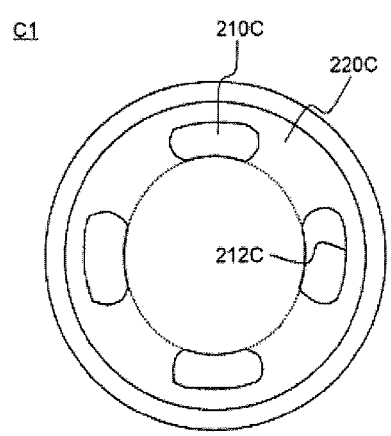
FIG. 19 is a plan view typically illustrating the outside of a cathode terminal of a conventional cylindrical secondary battery.

FIG. 18 is a side view typically illustrating the coupling between the connection member of FIG. 15 and electrode terminals of cylindrical battery cells, and FIG. 19 is a plan view typically illustrating the outside of a cathode terminal of a conventional cylindrical secondary battery.

Referring first to FIG. 19, four gas exhaust ports 210C are formed at the outer circumferential region of the cathode terminal 220C of the cylindrical battery cell C1 such that gas generated in the battery cell is exhausted through the gas exhaust ports 210C.

Referring to FIG. 18, the protruding coupling parts 330, located at the upper part of the connection member, are inserted into and elastically coupled to the gas exhaust ports 210C (see FIG. 19) of the cathode terminal 220C of an upper battery cell C1. At this time, the central connection part 340 contacts the cathode terminal 220C of the upper battery cell C1, whereby the electrical connection therebetween is achieved. Also, the coupling protrusions 332, formed at the inner side of the respective protruding coupling parts 230 in the central axis direction thereof, are coupled to inside ends 212C of the respective gas exhaust ports 210C formed at the cathode terminal 220C of the upper battery cell C1, whereby the stable coupling is achieved.

On the other hand, the outer circumferential connection part 310, located at the lower part of the connection member, contacts the outer circumference of an anode terminal 310C of a lower battery cell C2, and the auxiliary connection parts 360, extending downward from the ends of the upward protruding parts 320, partially contact the outer circumference of the anode terminal 310C of the lower battery cell C2. As a result, the upper battery cell C1 and the lower battery cell C2 are electrically connected in series to each other.

Figure 20:
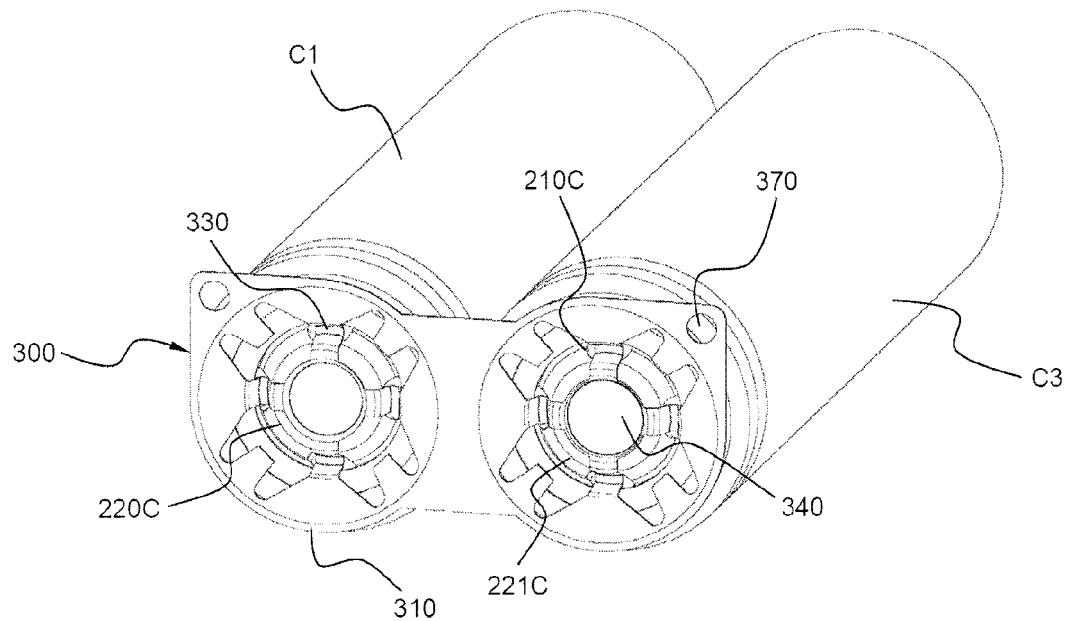
FIG. 20 is a perspective view illustrating a structure in which the connection member of FIG. 15 is coupled to electrode terminals of cylindrical battery cells such that the cylindrical battery cells are connected in parallel to each other.
Figure 21:
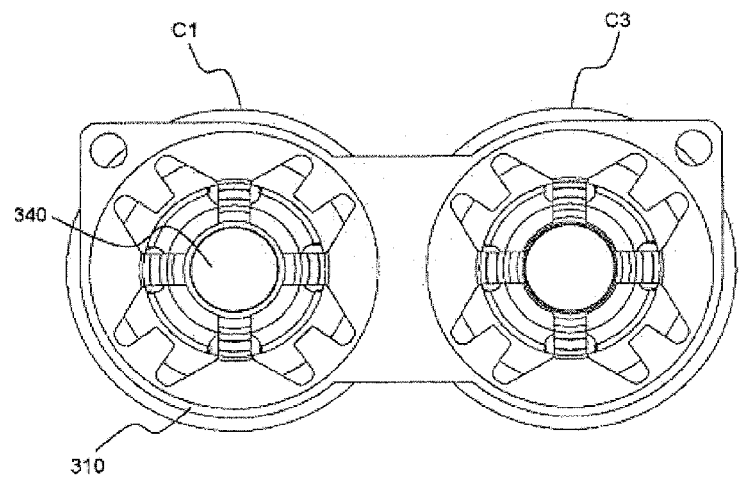
FIG. 21 is a typical front view of the structure shown in FIG. 20 in the coupling state.
Figure 22:
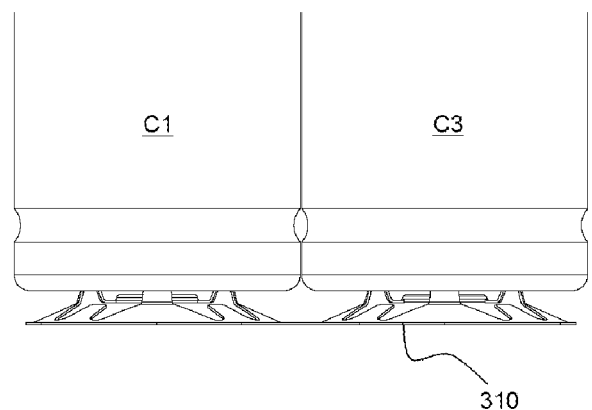
FIG. 22 is a typical plan view of the structure shown in FIG. 20 in the coupling state.

FIG. 20 is a perspective view typically illustrating a structure in which the connection member of FIG. 15 is coupled to electrode terminals of cylindrical battery cells such that the cylindrical battery cells are connected in parallel to each other. FIG. 21 is a typical front view of the structure shown in FIG. 20 in the coupling state, and FIG. 22 is a typical plan view of the structure shown in FIG. 20 in the coupling state.

Referring to these drawings, two cylindrical battery cells C1 and C3 are arranged adjacent to each other in the lateral direction, while cathode terminals 220C and 221C of the respective cylindrical battery cells C1 and C3 are oriented in the same direction, to constitute a bank.

The protruding coupling parts 330 of the connection member 300 are inserted into the corresponding gas exhaust ports 210C of the cylindrical battery cells C1 and C3, whereby the connection member 300 is elastically coupled to the cylindrical battery cells C1 and C3. Consequently, the physical coupling between the bank-structured cylindrical battery cells C1 and C3 is maintained by the connection member 300. Since the coupling protrusions (not shown) are elastically coupled to the respective gas exhaust ports 210C, when the protruding coupling parts 330 of the connection member 300 are inserted into the respective gas exhaust ports 210C, as previously described with reference to FIG. 18, the coupling force is very high. On the other hand, when the connection member 300 is needed to separate as necessary, a tensile force enough to elastically bend backward the coupling protrusions may be applied to the coupling protrusions, with the result that the connection member 300 is separated from the cylindrical battery cells C1 and C3.

Also, when the connection member 300 is coupled to the cylindrical battery cells C1 and C3, the bank is constructed in a structure in which the cylindrical battery cells C1 and C3 are connected in parallel to each other. The connection member 300 is made of a conductive material, such as a metal plate. Consequently, when the respective central connection parts 340 contact the cathode terminals 220C and 221C of the respective cylindrical battery cells C1 and C3, the electrical connection between the cathode terminals 220C and 221C of the respective cylindrical battery cells C1 and C3 is achieved. When the connection member 300 is coupled to the bank, the connection member 300 is arranged such that the outer circumferential connection parts 310 are directed frontward. Consequently, when other cylindrical battery cells (not shown) are located in front of the connection member 300, as shown in FIG. 18, the connection in series between the cylindrical battery cells is achieved.

Also, the circuit connection terminal parts 370 are formed at the opposite-side upper ends of the connection member 300 in the form of a drilled hole, whereby the cylindrical battery cells connected in series and parallel to one another may be connected to an external circuit.

FIGS. 23 to 26 are typical views illustrating various modifications of the connection member shown in FIG. 15.

Figure 23:
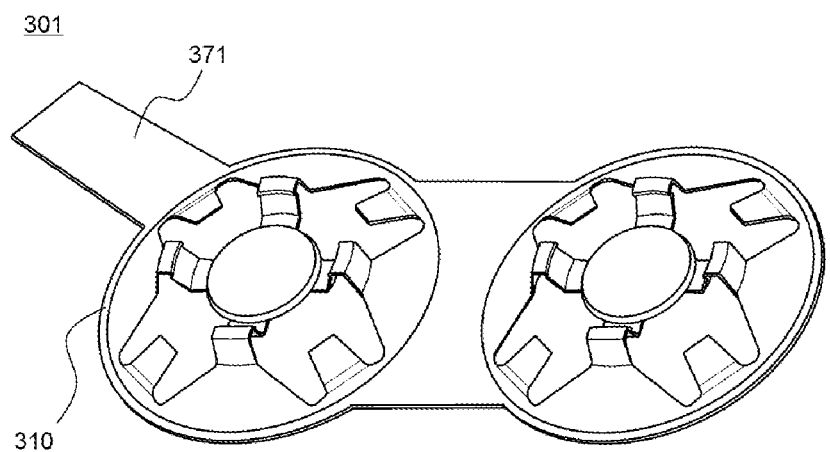
FIGS. 23 to 26 are typical views illustrating various modifications of the connection member shown in FIG. 15.

First, a connection member 301 of FIG. 23 is different from the connection member 300 of FIG. 15 in that a circuit connection terminal part 371 is formed in the shape of a strip extending from one of the outer circumferential connection parts 310. The strip-shaped circuit connection terminal part 371 may be bent such that the circuit connection terminal part 371 is brought into tight contact with the side of a lower battery cell (not shown) after the connection member 301 is mounted to the lower battery cell.

Figure 24:
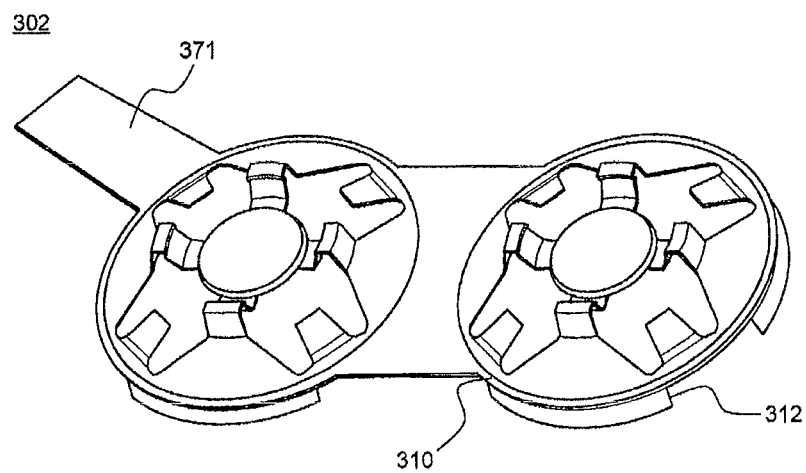

A connection member 302 of FIG. 24 is different from the connection member 300 of FIG. 15 in that a circuit connection terminal part 371 is formed in the shape of a strip extending from one of the outer circumferential connection parts 310, and two or more downward extensions 312 are formed at the outer circumference of each outer circumferential connection part 310 to partially cover the upper-end sides of lower battery cells.

The downward extensions 312 are constructed in a structure to partially cover the upper-end sides of the lower battery cells. Consequently, the downward extensions 312 prevent the connection member 302 from deviating in position from the lower battery cells due to external impact and maintain the secure coupling between the connection member 302 and the lower battery cells.

This structure enables the connection member to be connected to the upper battery cells and the lower battery cells in a coupling fashion. That is, the protruding coupling parts of the connection member are coupled to the electrode terminals of the upper battery cells, and the downward extensions of the connection member are coupled to the electrode terminals of the lower battery cells. Consequently, the connection member is coupled to both the upper and lower battery cells.

Figure 25:
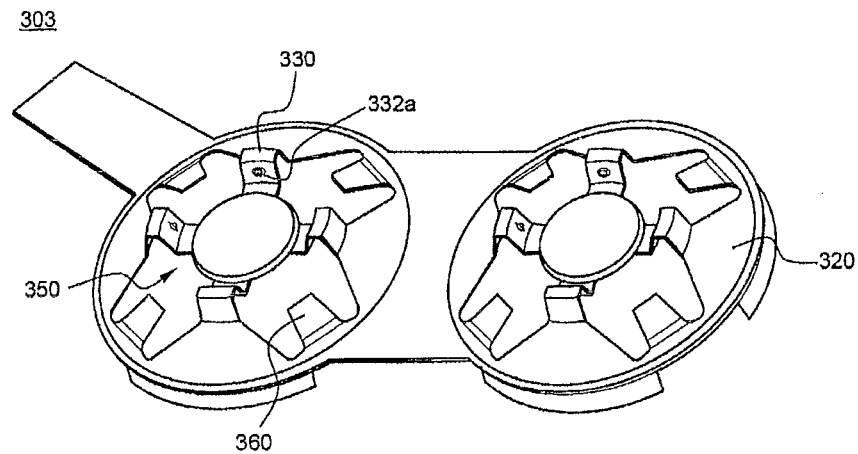

A connection member 303 of FIG. 25 is different from the connection member 302 of FIG. 22 in that coupling protrusions 332a protrude from the inner side of the protruding coupling parts 330 in the shape of a hemispherical protrusion. The hemispherical protrusion-shaped coupling protrusions 332a increase the mechanical coupling force between the connection member 303 and upper battery cells (not shown) when the connection member 303 is coupled to the upper battery cells.

Figure 26:
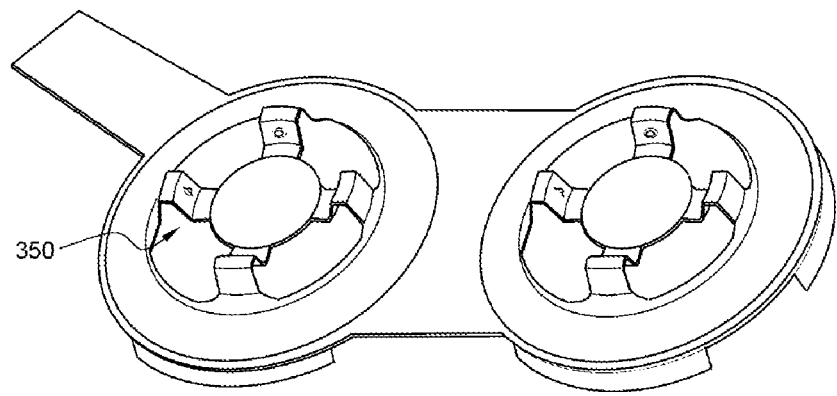

A connection member 304 of FIG. 26 is different from the connection member 303 of FIG. 25 in that no auxiliary connection parts protrude between the bridges 350. Specifically, the connection member 303 of FIG. 25 is constructed in a structure in which auxiliary connection parts 360 extending from the ends of the upward protruding parts 320 are formed between the bridges 350, whereas the connection member 304 of FIG. 26 has no auxiliary connection parts.

Figure 27:
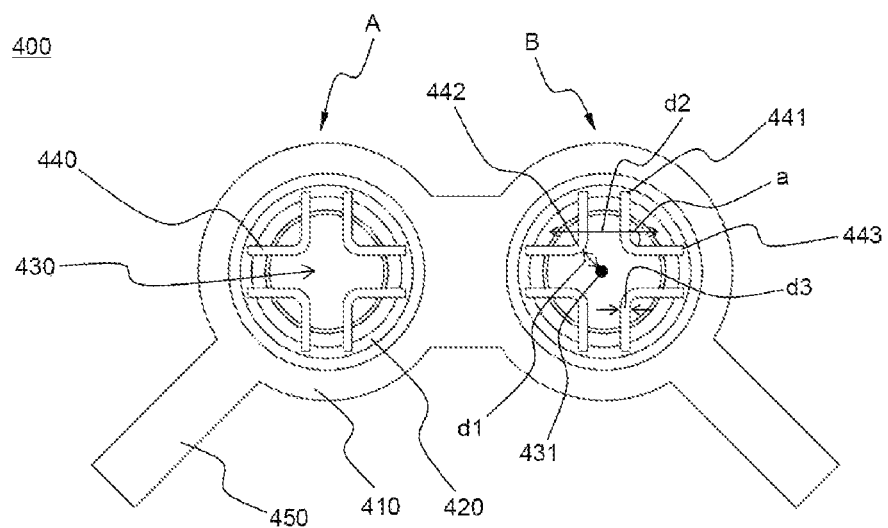
FIG. 27 is a plan view typically illustrating a connection member according to a fourth preferred embodiment of the present invention.
Figure 28:
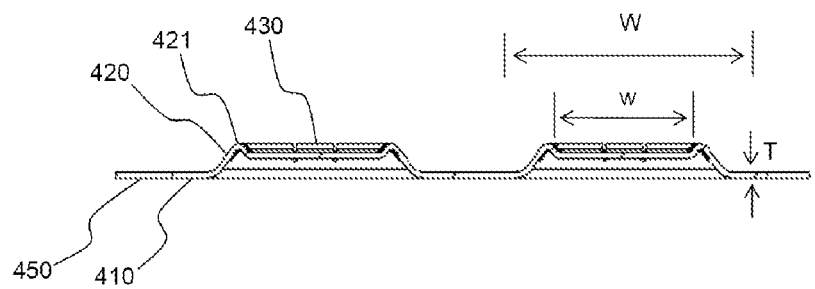
FIG. 28 is a typical sectional view of the connection member according to the fourth preferred embodiment of the present invention.

FIG. 27 is a plan view typically illustrating a connection member according to a fourth preferred embodiment of the present invention, and FIG. 28 is a typical sectional view of the connection member according to the fourth preferred embodiment of the present invention.

Referring to these drawings, the connection member 400 includes two terminal connection units A and B connected to each other and side extension parts 450 where circuit connection terminal parts for connection to an external circuit are located. Here, the external circuit connection terminal parts may be input and output terminals for power supply, detection terminals for voltage detection, or combinations thereof.

Each of the terminal connection units includes an outer circumferential connection part 410 formed in the shape corresponding to the external shape of an electrode terminal of a battery cell and connected to an electrode terminal of a lower battery cell (not shown) at a region adjacent to the outer circumference of the connection member, the outer circumferential connection part 410 having a predetermined width, an upward protruding part 420 extending from the outer circumferential connection part 410 toward a central axis of each terminal connection unit such that the upward protruding part 420 is tapered upward, and a central connection part 430 connected to an electrode terminal of a battery cell (not shown) located above the connection member 400.

At the upward protruding part 420 and the central connection part 430 are formed cut-out parts 440 constructed in a bridge structure in which the cut-out parts 440 extend from the upward protruding part 420 to the central connection part 430 and successively extend from the central connection part 430 to the upward protruding part 420.

The central connection part 430 has a contact interface w of a size equivalent to approximately 60% of the surface area W of the electrode terminal of the upper battery cell (not shown).

Meanwhile, the outer circumferential connection part 410 and the central connection part 430 are electrically connected to an anode terminal (not shown) of the lower battery cell and a cathode terminal (not shown) of the upper battery cell, respectively, in a physical contact manner.

Each cut-out part 440 is constructed in a structure in which a cut-out start point 441 and a cut-out end point 443 form an angle a of approximately 90 degrees under a condition that each cut-out part 440 does not reach the central axis 431 of the connection member 400. Also, the cut-out parts 440 are radially arranged in a symmetrical structure in which the four cut-out parts 440 are symmetrically disposed about the central axis 431 of the connection member 400. And the distance dl between the central axis 431 of the connection member 400 and a region 442 of the connection member 400 where the connection member 400 is the most adjacent to the central axis 431 of the connection member 400 is approximately 20% of the width d2 of the central connection part 430.

Also, the respective cut-out parts 440 are cut out with a width d3 equivalent to approximately 130% of the thickness T of the connection member. And the respective cut-out parts 440 pass through the uppermost portion 421 of the upward protruding part 420.

By the provision of the cut-out parts 440, it is possible for the upward protruding part 420 to exhibit appropriate flexibility as well as elasticity. Consequently, it is possible to prevent the occurrence of an instantaneous short circuit of the battery cell due to an external factor, such as vibration, thereby continuously maintaining the electrical connection between the battery cells.

Figure 29:
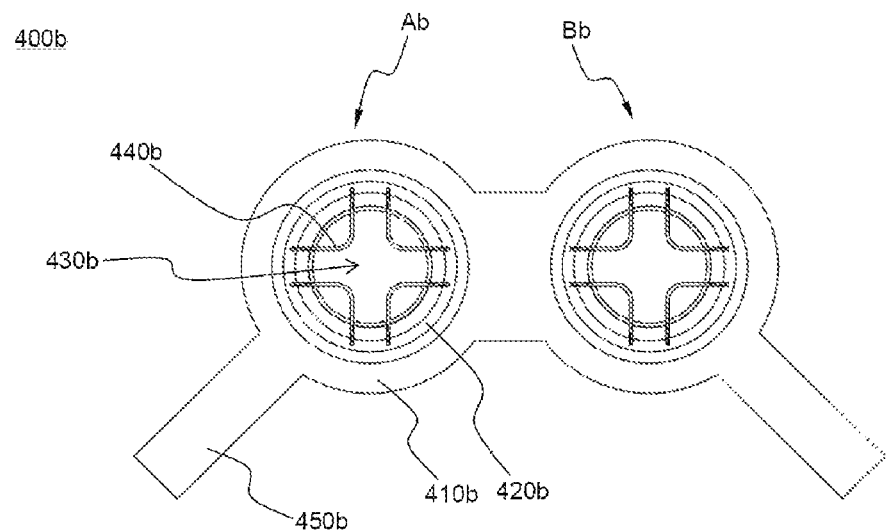
FIG. 29 is a plan view typically illustrating a connection member according to a modification of FIG. 27.
Figure 30:
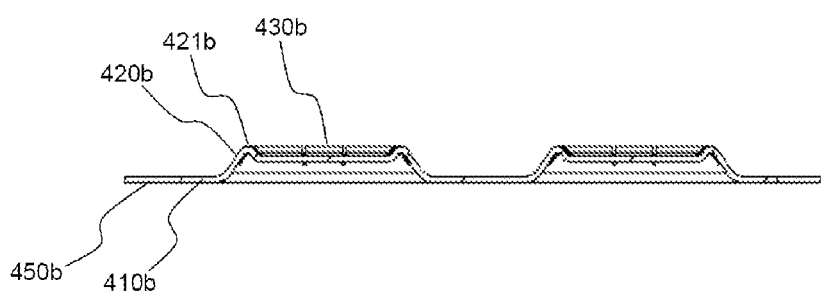
FIG. 30 is a typical sectional view of the connection member shown in FIG. 29.
Figure 31:
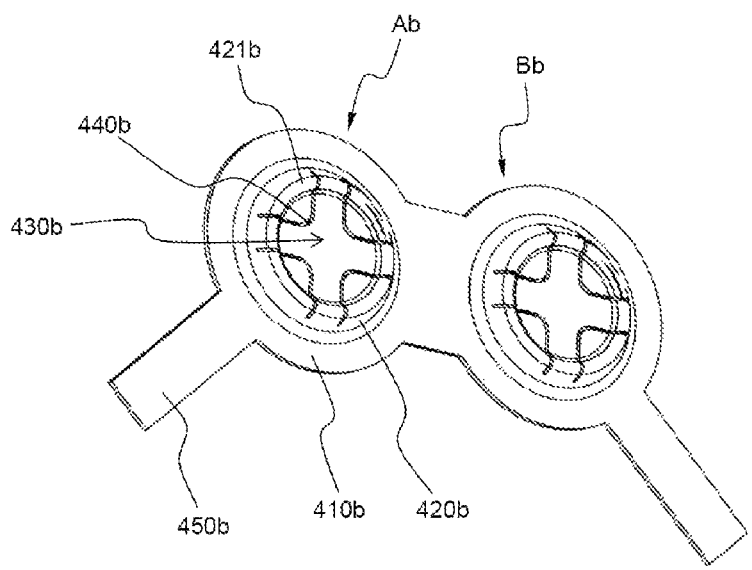
FIG. 31 is a perspective view of the connection member shown in FIG. 29.

FIG. 29 is a plan view typically illustrating a connection member according to a modification of FIG. 27. FIG. 30 is a typical sectional view of the connection member shown in FIG. 29, and FIG. 31 is a perspective view of the connection member shown in FIG. 29.

Referring to these drawings, the connection member 400b includes two terminal connection units Ab and Bb connected to each other and side extension parts 450b where circuit connection terminal parts for connection to an external circuit are located.

Each of the terminal connection units includes an outer circumferential connection part 410b connected to an electrode terminal of a lower battery cell (not shown), an upward protruding part 420b extending from the outer circumferential connection part 410b toward a central axis of each terminal connection unit such that the upward protruding part 420b is tapered upward, and a central connection part 430b connected to an electrode terminal of a battery cell (not shown) located above the connection member 400b. At the upward protruding part 420b and the central connection part 430b are formed cut-out parts 440b constructed in a slit structure in which the cut-out parts 440 extend from the upward protruding part 420b to the central connection part 430b and successively extend from the central connection part 430b to the upward protruding part 420b.

Figure 32:
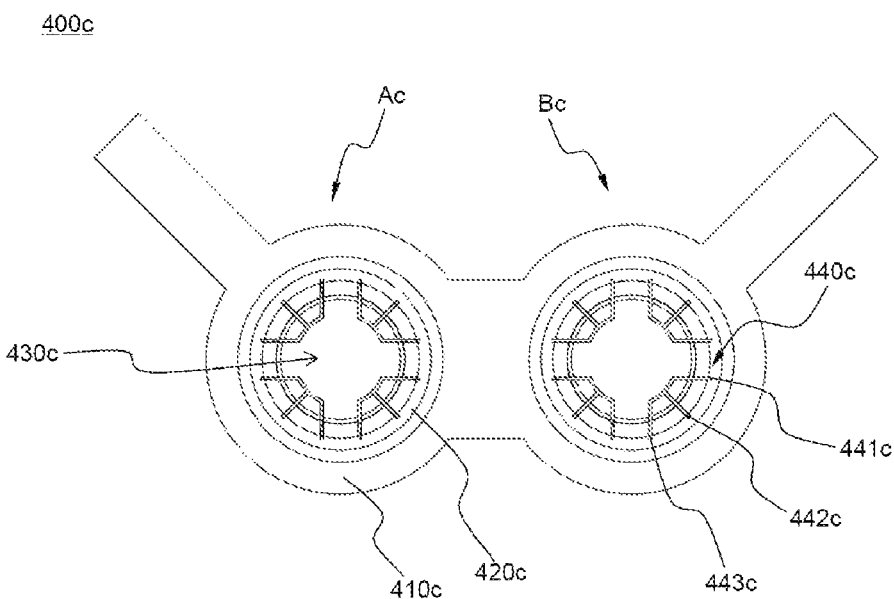
FIG. 32 is a plan view typically illustrating a connection member according to another modification of FIG. 27.
Figure 33:
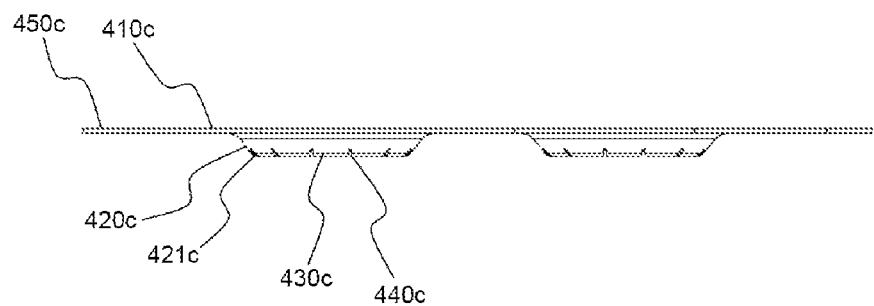
FIG. 33 is a typical sectional view of the connection member shown in FIG. 32.

FIG. 32 is a plan view typically illustrating a connection member according to another modification of FIG. 27, and FIG. 33 is a typical sectional view of the connection member shown in FIG. 32.

Referring to these drawings, the connection member 400c includes two terminal connection units Ac and Bc connected to each other and side extension parts 450c where circuit connection terminal parts for connection to an external circuit are located.

Each of the terminal connection units includes an outer circumferential connection part 410c connected to an electrode terminal of a lower battery cell (not shown), an upward protruding part 420c extending from the outer circumferential connection part 410c toward a central axis of each terminal connection unit such that the upward protruding part 420c is tapered upward, and a central connection part 430c connected to an electrode terminal of a battery cell (not shown) located above the connection member 400c.

At the upward protruding part 420c and the central connection part 430c are formed cut-out parts 440c constructed in a slit structure in which each cut-out part 440c extends from one cut-out start point 441c of the upward protruding part 420c to the central connection part 430c and successively extends from the central connection part 430c to two cut-out end points 442c and 443c of the upward protruding part 420c.

By the provision of the cut-out parts 440c, it is possible to control the elasticity of the upward protruding part 420c to a desired degree.

INDUSTRIAL APPLICABILITY

As apparent from the above description, the battery pack according to the present invention does not need a welding or soldering process for electrical connection between electrode terminals of battery cells. Consequently, it is possible to prevent the occurrence of short circuits of the battery cells, which may be caused during welding, and to greatly reduce the defective production ratio.

Also, it is possible to minimize the change in resistance at the connection regions through the stable coupling structure between the electrode terminals of the secondary battery cells and to greatly improve the production efficiency. In addition, when an external force, such as dropping or vibration, is applied to the battery pack, it is possible to protect the battery cells from the external force.

Furthermore, it is possible to maintain the stable connection of the battery pack even when in use for a long period of time, while not causing the increase in size of the battery pack although the battery pack is constructed in an electrically connection structure not using welding.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed:

1. A connection member for electrically connecting a plurality of secondary battery cells, wherein the connection member is located between the battery cells arranged in the longitudinal direction or in both the longitudinal direction and the lateral direction, the connection member is connected, in a mechanical coupling manner, to a lower electrode terminal of the front battery cell in the longitudinal direction or to an upper electrode terminal of the rear battery cell in the longitudinal direction, and the connection member is elastically pressed while the connection member is located between the battery cells, wherein the connection member comprises a terminal connection unit for connecting the battery cells arranged in the longitudinal direction in series to each other, the terminal connection unit comprising:

(a) an outer circumferential connection part configured to correspond to the external shape of an electrode terminal of a battery cell located below the connection member (a lower battery cell), the outer circumferential connection part contacting the electrode terminal of the lower battery cell at a region adjacent to the outer circumference of the electrode terminal, the outer circumferential connection part having a predetermined width;

(b) an upward protruding part tapered upward from the outer circumferential connection part toward a central axis of the terminal connection unit for elastically supporting the lower battery cell; and (c) a central connection part contacting an electrode terminal of a battery cell located above the connection member (an upper battery cell), the central connection part being formed to have a plate shape and on a same horizontal plane with the upper most portion of the upward protruding part, the terminal connection unit being constructed in a structure in which cut-out parts are formed at the upward protruding part and the central connection part, such that the cut-out parts extend from the upward protruding part to the central connection part and successively extend from the central connection part to the upward protruding part, to increase an elastically supporting force with respect to the electrode terminal of the battery cell, and wherein each of the cut-out parts is constructed in a structure in which a cut-out start point and a cut-out end point form an angle of 20 to 160 degrees under a condition that each of the cut-out parts does not reach the central axis of the connection member, wherein there are four cut-out parts, and the four cut-out parts are radially arranged in a symmetrical structure in which the four cut-out parts are symmetrically disposed about the central axis of the connection member.

2. The connection member according to claim 1, wherein the central connection part has a contact interface of a size equivalent to 20% to 60% of the surface area of the electrode terminal of the upper battery cell.

3. The connection member according to claim 1, wherein two or more terminal connection units are connected to each other to simultaneously achieve the connection in series between the battery cells arranged in the longitudinal direction and the connection in parallel between battery cells arranged in the lateral direction.

4. The connection member according to claim 1, wherein the outer circumferential connection part is further provided at the outer circumference thereof with one or more downward extensions constructed in a structure to partially cover the upper-end side of the lower battery cell.

5. The connection member according to claim 1, wherein the terminal connection unit is provided at one side thereof with a circuit connection terminal part.

6. A battery pack constructed in a structure in which a connection member according to claim 1 is mounted between electrode terminals of battery cells to achieve the electrical connection between the battery cells.

7. A laptop computer including a battery pack according to claim 6 as a power source.

* * * * *